(12) United States Patent
Izumi

(10) Patent No.: US 6,741,528 B1
(45) Date of Patent: May 25, 2004

(54) MAGNETO-OPTICAL HEAD DEVICE

(75) Inventor: Haruhiko Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/600,799

(22) PCT Filed: Feb. 22, 1999

(86) PCT No.: PCT/JP99/00799
§ 371 (c)(1),
(2), (4) Date: Jul. 21, 2000

(30) Foreign Application Priority Data

Mar. 19, 1998 (JP) .......................... 10-070518
Nov. 20, 1998 (JP) .......................... 10-331737

(51) Int. Cl.$^7$ ................................. G11B 7/00
(52) U.S. Cl. ..................... 369/13.3; 369/112.16
(58) Field of Search .................. 369/44.23, 44.24, 369/107, 108, 112.01, 112.08, 112.09, 112.16, 112.17, 110.04, 112.14, 112.18, 112.19, 13.28, 13.29, 13.3, 13.31

(56) References Cited

U.S. PATENT DOCUMENTS

| | | | | |
|---|---|---|---|---|
| 5,189,651 A | * | 2/1993 | Utsumi ..................... | 369/44.23 |
| 5,600,614 A | * | 2/1997 | Katayama ................ | 369/44.23 |
| 5,610,895 A | * | 3/1997 | Izumi et al. ............. | 369/44.24 |
| 6,025,866 A | * | 2/2000 | Tsuchiya et al. ............ | 347/256 |

FOREIGN PATENT DOCUMENTS

| | | |
|---|---|---|
| JP | 5877047 | 5/1983 |
| JP | 76379 | 1/1995 |
| JP | 7141681 | 6/1995 |
| JP | 7141714 | 6/1995 |
| JP | 831002 | 2/1996 |
| JP | 8221795 | 8/1996 |
| JP | 2664327 | 6/1997 |

* cited by examiner

Primary Examiner—Thang V. Tran
Assistant Examiner—Bach Vuong
(74) Attorney, Agent, or Firm—Greer, Burns & Crain, Ltd.

(57) ABSTRACT

P-polarized parallel rays are irradiated on a magneto-optical disk 1 and reflected. The reflected light is reflected by a first beam splitter 14 and supplied to a reproduced signal detection system 20. This reflected light is supplied to a light shading plate 21, and a p-polarized component is transmitted at a transmittance of substantially 100% and an s-polarized component is transmitted at a transmittance of substantially 0%, i.e., reflected or absorbed so as to be shaded, in the area of a polarization film 21b. The light transmitted through the light shading plate 21 incides on a polarization beam splitter 19 where it is split into the p-polarized component and s-polarized component, and a reproduced signal is detected by differential detection. Since the outputs of photodiodes 22 and 23 are not proportional to the amplitude of light but are proportional to the power of light, the reproduced signal itself is magnified with an increase in the amount of light transmitted through the light shading plate 21, and the S/N is improved.

15 Claims, 27 Drawing Sheets

MAGNETO-OPTICAL HEAD DEVICE

FIELD OF THE INVENTION

The present invention relates to a magneto-optical head device for reproducing magneto-optically recorded data, and more particularly to reproduction of high-density recorded data.

BACKGROUND ART

A magneto-optical disk device is capable of storing a large capacity of data, and there has been demand for multi-media systems having further increased capacity. The inventors of the present application proposed an optical head device capable of achieving super resolution reproduction of data recorded on an optical disk by providing a light shading plate in an optical head unit of the magneto-optical disk device (U.S. Pat. No. 2,664,327).

In this optical head device, after a light beam emitted by a semiconductor laser as a light source is made parallel rays by a collimator lens and caused to have a circular cross section by a prism for correcting the axial symmetry of the laser, the resulting light beam transmits through a first beam splitter and is then condensed on a magneto-optical disk by an objective lens. On the magneto-optical disk, data is recorded by orienting the magnetization of a recording film in a direction corresponding to data to be recorded. By applying an external magnetic field to the recording film which has been heated to a temperature of not lower than its Curie temperature by the irradiation of the light beam, the magnetization of the recording film is oriented in a desired direction.

The reflected light from the magneto-optical disk is made parallel rays by the objective lens, and then incides again on the first beam splitter and is reflected. The reflected light is split into two beams by a second beam splitter so that one is used for a detection of a servo signal and the other is used for a detection of a reproduced signal. The light used for the detection of a reproduced signal transmits through a light shading plate and then incides on a reproduced signal detection unit. The reproduced signal detection unit includes a half-wave plate, a polarization beam splitter and photodiodes. The light shading plate is formed by providing an opaque film at substantially the center of a transparent substrate, so that light does not transmit through a portion where the opaque film is formed but transmits through the surrounding portion.

The light transmitted through the surrounding portion of the light shading plate is transmitted through the half-wave plate so that it is rotated at 45 degrees, and then split into a p-polarized component and an s-polarized component by the polarization beam splitter. When the light emitted by the light source is p-polarized light, the reflected light from the magneto-optical disk contains an s-polarized component as a signal component due to the magnetic Kerr effect. The p-polarized component and s-polarized component obtained by the transmission of the half-wave plate for the rotation of 45 degrees and the polarization beam splitter are received by the photodiodes, respectively, and the difference between the components is calculated to provide a reproduced signal.

In the magneto-optical head device with the above structure, when the reflected light from the magneto-optical disk transmits through the light shading plate, the central portion of the reflected light in the irradiated spot on the magneto-optical disk is shaded, thereby obtaining a super resolution effect on the reproduced signal. FIG. 1 shows an example of the amplitude characteristic of the transfer function of the magneto-optical head device. The vertical axis represents the degree of modulation, and the horizontal axis represents the spatial frequency. In the graph, a graph with the light shading plate shows the characteristics of the above-described magneto-optical head device, while a graph without the light shading plate shows the characteristics obtained by performing differential detection with the use of the whole reflected light for the detection of a reproduced signal. It will be understood from the graph that the magneto-optical head having the light shading plate at a spatial frequency ranging from 800 to 1000 (cycle/mm) achieves a higher degree of modulation. Therefore, high-density recorded data can be reproduced with excellent resolution by providing the light shading plate which shades the transmission of the central portion of light.

Hence, the magneto-optical head with the above-described structure can achieve super resolution reproduction of high-density recorded data. However, since a portion of light transmitted through the light shading plate is shaded, the amount of light received by the photodiodes is reduced. FIG. 2 is a graph showing the transmittance distribution of the light shading plate with the vertical axis representing the transmittance and the horizontal axis representing the distance from the center of the light shading plate. It will be understood from the graph that the transmittance is 0% in the area of radius $r_0$ at the center of the light shading plate. Therefore, in comparison with the magneto-optical head without a light shading plate, the amount of light received by the photodiodes is lower, and the reproduced signal itself is lessened though the resolution of the reproduced signal is high. For this reason, the above-described magneto-optical head device with the light shading plate has a problem that the S/N of the reproduced signal deteriorates.

In view of the above circumstances, the present invention was made, and its object is to provide a magneto-optical head device capable of improving the S/N by magnifying a reproduced signal itself and achieving super resolution reproduction by the inclusion of light shading means for transmitting a predetermined polarized component at a higher ratio than other polarized component, or light shading means for transmitting the predetermined polarized component while shading the other polarized component.

DISCLOSURE OF THE INVENTION

A magneto-optical head device according to the present invention is a magneto-optical head device for obtaining a reproduced signal with the use of reflected light from a magneto-optical recording medium, and characterized by including light shading means on which the reflected light incides and providing the light shading means with a polarization film having a higher transmittance for a predetermined polarized component than for other polarized component in substantially a central portion of the incident reflected light.

Therefore, in substantially the central portion of the reflected light incident on the light shading means having the light shading film, i.e., the central portion of the optical amplitude distribution, a greater amount of the predetermined polarized component than the other polarized component is transmitted. Here, the predetermined polarized component refers to a polarized component which is not a signal component. Since the outputs of photodiodes during the detection of a reproduced signal are not proportional to the amplitude of light but are proportional to the power of light, the reproduced signal itself is magnified with an increase in the amount of light transmitted through the light shading means, and the S/N is improved. Moreover, since the transmittance of a polarized component as a signal component is low, super resolution reproduction can be achieved The magneto-optical head device according to the present invention is a magneto-optical head device including: an objective lens on which reflected light from a magneto-optical recording medium incides; a beam splitter for splitting the reflected light into a light beam for a reproduced signal detection unit and a light beam for a focusing error and tracking error detection unit; light shading means on which the reflected light incides; and the reproduced signal detection unit for detecting a reproduced signal with the use the reflected light transmitted through the light shading means, and characterized in that the light shading means is provided with a polarization film having a higher transmittance for a predetermined polarized component than for other polarized component in substantially a central portion of the incident reflected light, and disposed at such a position that the reflected light split by the beam splitter incides thereon.

Hence, after the reflected light is split by the beam splitter, one of the split light incides on the light shading means to transmit a predetermined polarized component, and the other is used in the focusing error and tracking error detection system. Since the outputs of the photodiodes during the detection of a reproduced signal are not proportional to the amplitude of light but are proportional to the power of light, the reproduced signal itself is magnified with an increase in the amount of light transmitted through the light shading means, and the S/N is improved. Moreover, since the polarized component as a signal component is shaded, super resolution reproduction can be achieved. Furthermore, in comparison with a structure in which the reflected light is split by the beam splitter after being shaded by the light shading means, the amount of light for use in the focusing error and tracking error detection is increased.

The magneto-optical head device according to the present invention is a magneto-optical head device including: an objective lens on which reflected light from a magneto-optical recording medium incides; a beam splitter for splitting the reflected light into a light beam for a reproduced signal detection unit and a light beam for a focusing error and tracking error detection unit; light shading means on which the reflected light incides; and the reproduced signal detection unit for detecting a reproduced signal with the use of the reflected light transmitted through the light shading means, and characterized in that the light shading means is provided with a polarization film having a higher transmittance for a predetermined polarized component than for other polarized component in substantially a central portion of the incident reflected light, and disposed at such a position that the reflected light transmitted through the light shading means incides on the beam splitter.

Hence, after transmitting the predetermined polarized component in the central portion of the optical amplitude distribution of the reflected light through the light shading means, the reflected light is split by the beam splitter so that one of the split light incides on the reproduced signal detection system and the other is used in the focusing error and tracking error detection system. Since the outputs of the photodiodes during the detection of a reproduced signal are not proportional to the amplitude of light but are proportional to the power of light, the reproduced signal itself is magnified with an increase in the amount of light transmitted through the light shading means, and the S/N is improved. Moreover, since the polarized component which is a signal component is shaded, super resolution reproduction can be achieved.

The magneto-optical head device according to the present invention is characterized in that the above-described polarization film is a dielectric multilayer film which transmits the predetermined polarized component but reflects or absorbs the other polarized component.

Thus, since the dielectric multilayer film is used as the polarization film, substantially 100% of the predetermined polarized component is transmitted, while substantially 100% of the other polarized component is reflected or absorbed. Here, the predetermined polarized component refers to a polarized component which is not a signal component, and the reproduced signal itself is further magnified as the amount of light transmitted through the light shading means is further increased, thereby improving the S/N. In addition, since the polarized component which is a signal component is shaded at a higher ratio, super resolution reproduction with higher resolution can be achieved.

The magneto-optical head device according to the present invention is characterized in that the predetermined polarized component selectively transmitted through the polarization film is polarized in the same direction as the polarization direction of the light beam irradiated on the magneto-optical recording medium.

Accordingly, the emitted light beam is irradiated on the magneto-optical recording medium, reflected by the magneto-optical recording medium, and then incides on the light shading means. When the polarization direction of this light beam is, for example, p polarization, an s-polarized component as a signal component is produced by the magnetic Kerr effect during the reflection of the light beam, and the p-polarized component is a polarized component which is not a signal component. Therefore, since the polarized component that is not a signal component is transmitted, the amount of light transmitted through the light shading means is increased, and the reproduced signal itself is magnified. Furthermore, since the polarized component which is a signal component is shaded, super resolution reproduction can be achieved.

The magneto-optical head device according to the present invention is characterized by including condensing means for condensing the reflected light transmitted through the light shading means.

Hence, since the polarized components contained in the reflected light are respectively transmitted through the light shading means with different transmittances between substantially the central portion and the surrounding portion of the light and then condensed, the central portion of the light and the surrounding portion of the light are optically superimposed and supplied to the reproduced signal detection unit. For this reason, since the central portion of the transmitted light is directly related to component a of light proportional to the magnitude of the reproduced signal, the component a is increased, and consequently the S/N of the reproduced signal is further increased. As the condensing means, for example, a condenser lens is used, and positioned between the light shading means and the reproduced signal detection unit in the optical path of the reflected light. Alternatively, the condenser lens may be positioned on the incident side of the light shading means. In this case, the distance between the condenser lens and the light shading means is preferably set within a focal distance of the condenser lens so that the reflected light is transmitted through the light shading means before it is focused.

BEST MODE FOR CARRYING OUT THE INVENTION

The following description will specifically explaining the present invention with reference to the drawings illustrating embodiments of the invention.

Figure 1:
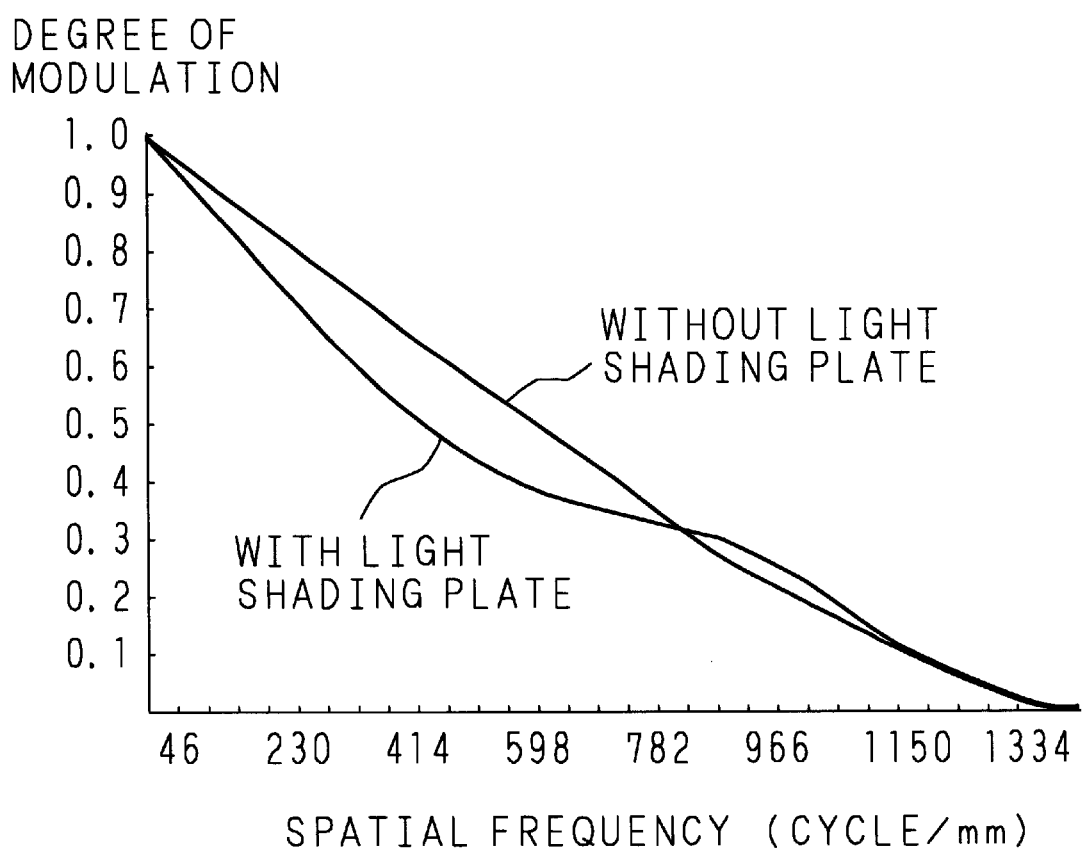
FIG. 1 is a graph showing the amplitude characteristic of the transfer function of a conventional magneto-optical head device.
Figure 2:
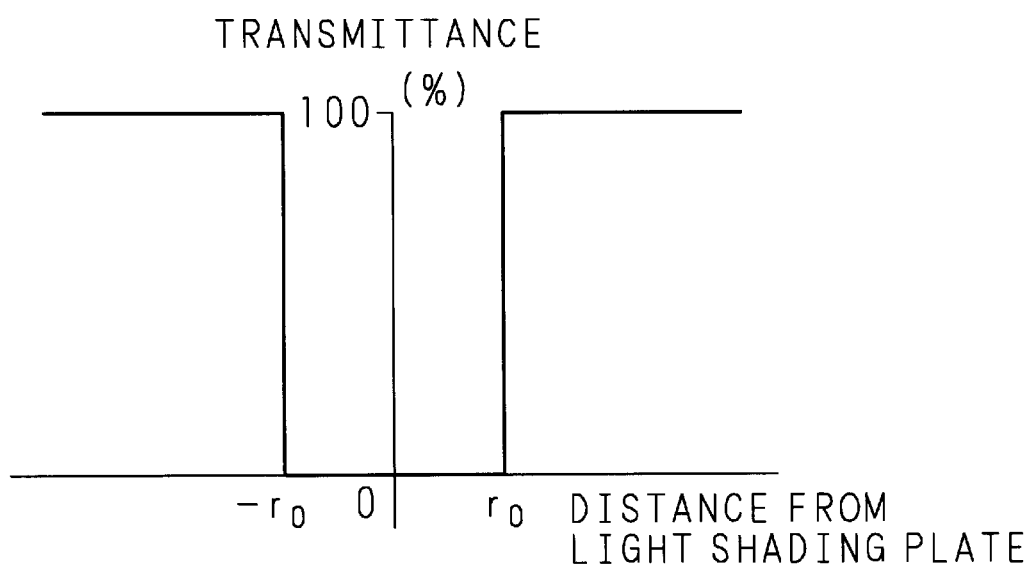
FIG. 2 is a graph showing the light transmittance of a light shading plate of the conventional magneto-optical head device.
Figure 3:
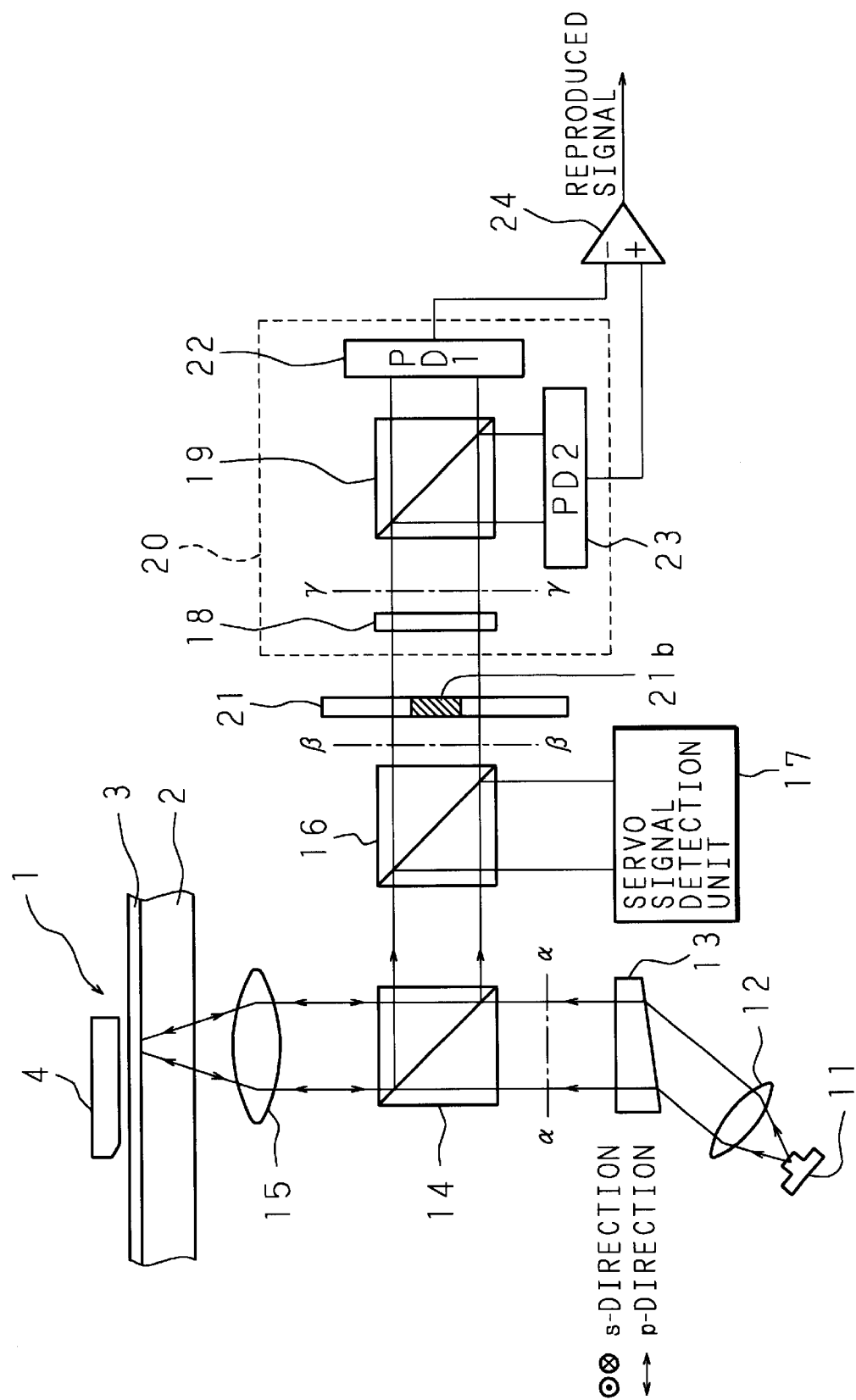
FIG. 3 is a structural view of a magneto-optical head device according to the present embodiment.

FIG. 3 is a structural view of a magneto-optical head device according to an embodiment of the present invention.

In FIG. 3, reference numeral 11 is a semiconductor laser light source, and laser light emitted therefrom is made parallel rays by a collimator lens 12, and then made circular parallel rays by a prism 13 for correcting the axial symmetry of the laser. The parallel rays are p-polarized light, incide on an objective lens 15 through a first beam splitter 14, and are then condensed on a magneto-optical disk 1 by the objective lens 15. The magneto-optical disk 1 includes a transparent substrate 2, and a recording film 3 on which the parallel rays are condensed by the objective lens 15. In addition, a magnetic head 4 is provided above the magneto-optical disk 1 so as to apply a predetermined magnetic field when performing recording/reproduction with respect to the magneto-optical disk 1.

After reflected light from the magneto-optical disk 1 is made parallel rays by the objective lens 15, they are reflected by the first beam splitter 14 to incide on a second beam splitter 16. The parallel rays incident on the second beam splitter 16 are split into two beams so that one is supplied to a reproduced signal detection system 20 and the other is supplied to a servo signal detection unit 17. In the servo signal detection unit 17, a focusing error signal and a tracking error signal are detected on the basis of outputs from a four-quadrant photodetector, not shown.

Figure 4:
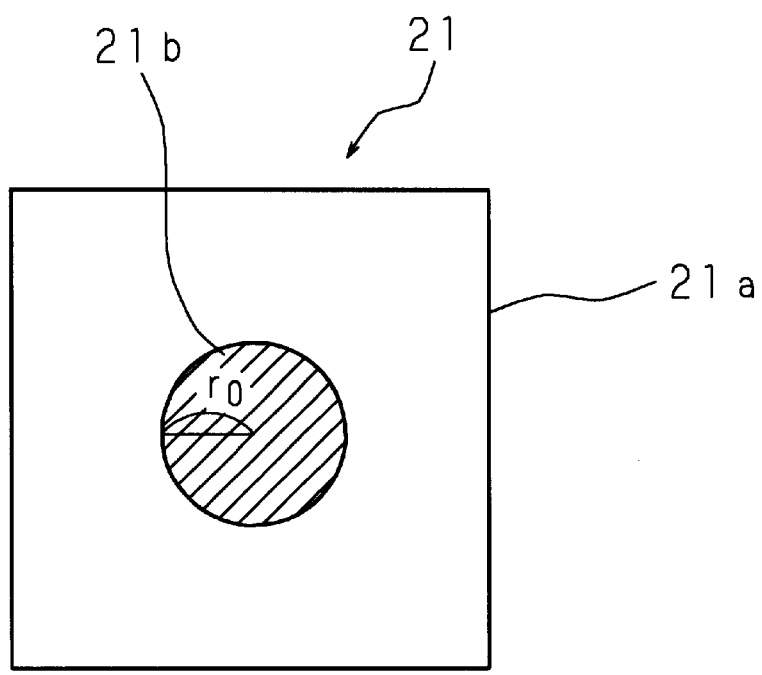
FIG. 4 is a plan view of a light shading plate according to the present embodiment.

The parallel rays supplied to the reproduced signal detection system 20 are supplied to a light shading plate 21 that is a characteristic feature of the present invention, and light transmitted through the light shading plate 21 incides on a half-wave plate (hereinafter referred to as the "½ wave plate") 18. FIG. 4 is a plan view showing the structure of the light shading plate 21. The light shading plate 21 includes a transparent flat plate 21a having substantially a rectangular shape in its plan view, and a polarization film 21b formed on a surface of the transparent flat plate 21a. The polarization film 21b is formed in the circular shape at substantially the center of the transparent flat plate 21a, and the position and radius $r_0$ thereof are set so as to shade the central portion of the reflected light. Incidentally, the polarization film 21b is formed by, for example, a dielectric multilayer film, and performs the function of reflecting or absorbing a predetermined polarized component like a film used in a polarization beam splitter.

Figure 5:
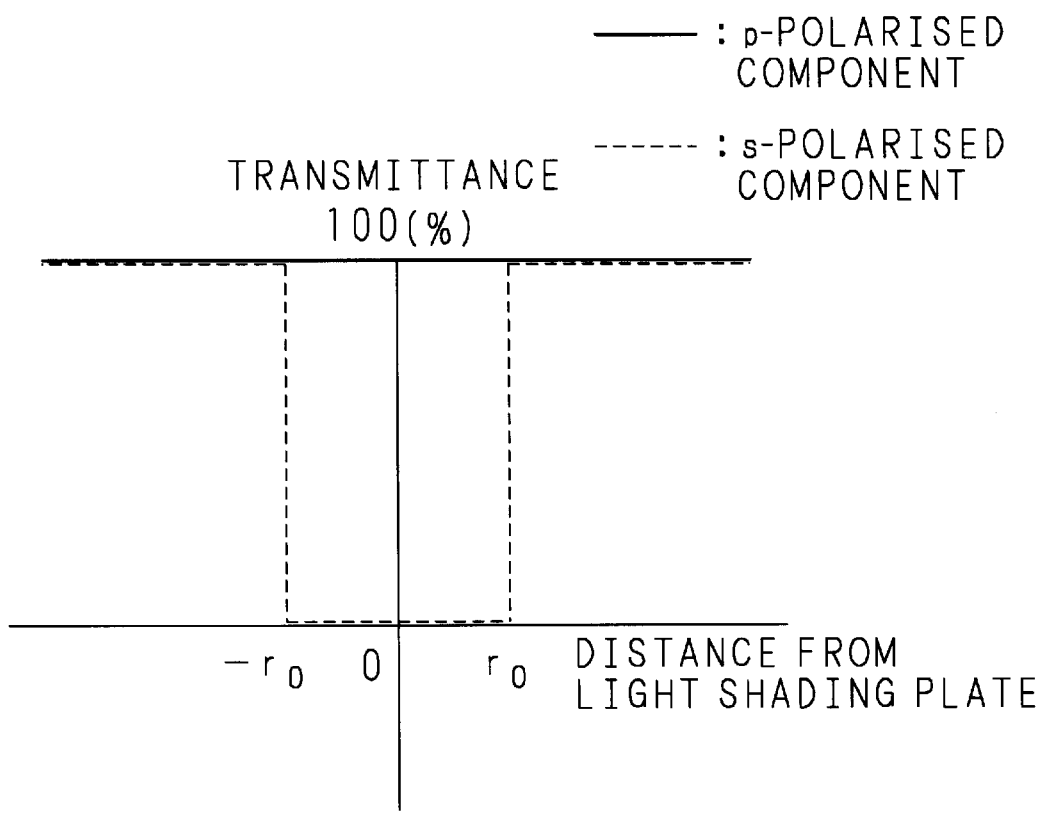
FIG. 5 is a graph showing the light transmittance of the light shading plate according to the present embodiment.

FIG. 5 is a graph showing the light transmittance distribution of the light shading plate used in this embodiment. The vertical axis indicates the transmittance, and the horizontal axis indicates the distance from the center of the light shading plate. In the graph, the solid line indicates the p-polarized component, and the broken line represents the s-polarized component. It will be understood from the graph that both of the p-polarized component and s-polarized component are transmitted at a transmittance of substantially 100% in areas other than the area of the polarization film 21b, while the p-polarized component is transmitted at a transmittance of substantially 100% and the s-polarized component is transmitted at a transmittance of substantially 0%, i.e., reflected or absorbed and thus shaded, in the area of the polarization film 21b.

Then, the light transmitted through the light shading plate 21 incides on the ½ wave plate 18 where the polarization direction is rotated at 45 degrees, and then on a polarization beam splitter 19 where it is split into a p-polarized component and an s-polarized component. The p-polarized component and s-polarized component are received by a photodiode (PD1) 22 and photodiode (PD2) 23, respectively, converted into electric signals and input to a differential amplifier 24 so as to detect a reproduced signal by differential detection.

Figure 6A:
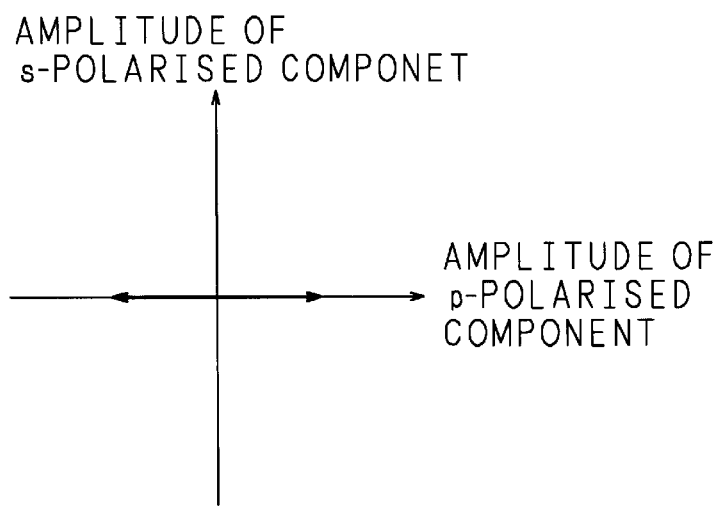
FIGS. 6A, 6B and 6C are graphs showing the polarized states of light on the light shading plate according to the present embodiment.
Figure 6B:
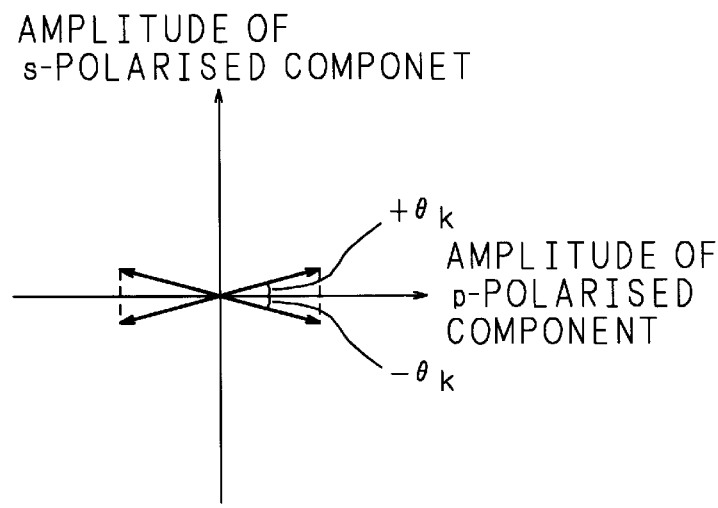
Figure 6C:
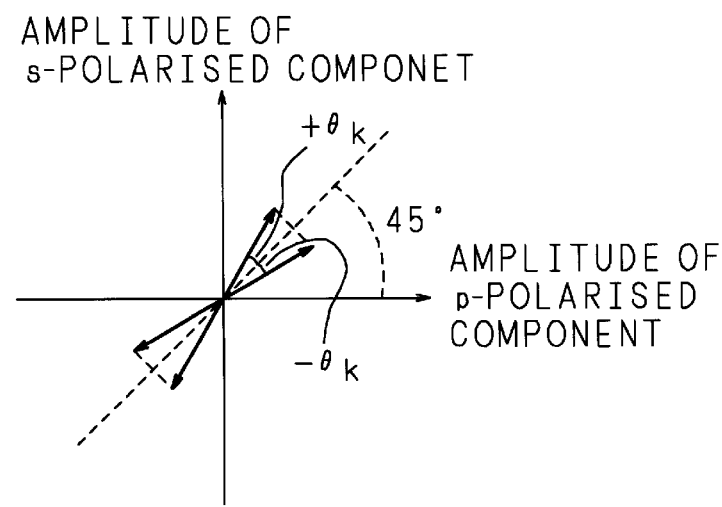

In order to describe the effects of the magneto-optical head device with the above-explained structure, first, the polarized states of light at respective positions in the optical path will be explained. FIG. 6 is a graph explaining the polarized states at the respective positions in the optical path shown in FIG. 3 with the vertical axis indicating the amplitude of the s-polarized component and the horizontal axis indicating the amplitude of the p-polarized component. FIG. 6A shows the polarized state on the α-α line. The parallel rays emitted from the prism 13 for correcting the axial symmetry of the laser are p-polarized light, and irradiated on the magneto-optical disk 1. The magnetization direction of the recording film 3 is oriented either upward or downward depending on data to be recorded, and the polarization direction of light is rotated by an amount of only $\pm\theta_k$ by the magnetic Kerr effect when reflected, thereby producing the s-polarized component. This state is the polarized state on the β—β line, and shown in FIG. 6B. The polarization direction of this light is rotated at 45 degrees by the ½ wave plate, the resulting light is received by the photodiodes 22 and 23 in the polarized state at the γ-γ line shown in FIG. 6C, and a reproduced signal is detected by differential detection in the differential amplifier 24.

Figure 7:
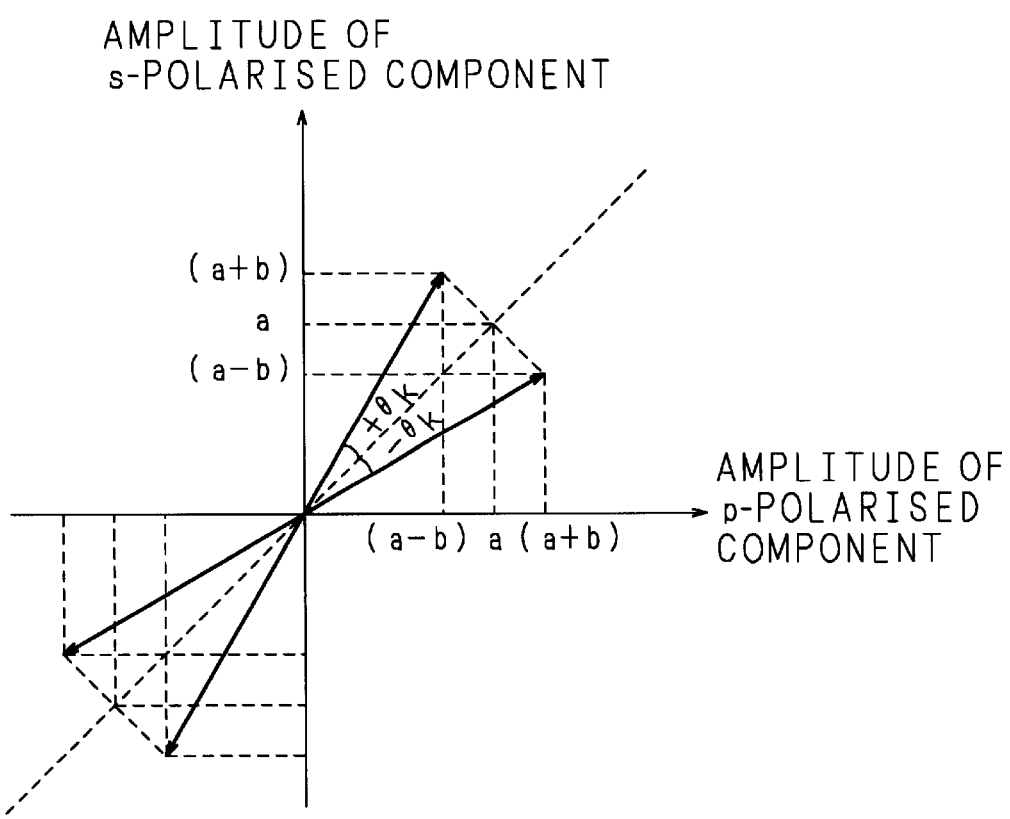
FIG. 7 is a graph explaining differential detection of a reproduced signal according to the present embodiment.

Next, the principal of differential detection will be explained. FIG. 7 is a graph explaining the principal of differential detection performed with the use of the magneto-optical head device of the present invention. The vertical axis indicates the amplitude of the s-polarized component, and the horizontal axis indicates the amplitude of the p-polarized component. The amplitudes of the p-polarized component and s-polarized component corresponding to the Kerr rotation angle $\pm\theta_k$ are given by the following equations (hereinafter double signs in same order).

p-polarized component amplitude=a∓b, and s-polarized component amplitude=a±b, where $$a = A\cos\theta_k \cos 45 = A\cos\theta_k \sin 45$$
$$= \frac{\sqrt{2}}{2} A\cos\theta_k$$
$$b = A\sin\theta_k \cos 45 = A\sin\theta_k \sin 45$$
$$= \frac{\sqrt{2}}{2} A\sin\theta_k$$

A: the amplitude of the reflected light.

The amplitudes of the p-polarized component and s-polarized component are subjected to photoelectric conversion in the photodiodes 22 and 23 so as to be converted into electric signals. Since the outputs from the photodiodes 22 and 23 are not proportional to the amplitude of light but are proportional to the power of light, they are expressed by the following equations.

Output of PD1=$K(a\mp b)^2$, and Output of PD2=$K(a\pm b)^2$, where K: photoelectric conversion coefficient.

Besides, the difference between the outputs, i.e., the reproduced signal, is expressed by the following equation.

PD2 output−PD1 output $$K(a \pm b)^2 - K(a \mp b)^2 = K(a^2 \pm 2ab + b^2) - K(a^2 \mp 2ab + b^2) \quad (1)$$
$$= \pm 4Kab$$

It will be understood from equation (1) that the reproduced signal is proportional not only to ±b given by the s-polarized component produced by the Kerr rotation angle $\pm\theta_k$, but also to a given by the p-polarized component. b is a signal component, but a is not a signal component. For this reason, by transmitting the p-polarized component and shading only the s-polarized component in the central portion of the reflected light by the light shading plate 21 as described above, the value of a increases and the reproduced signal itself can be magnified. Moreover, since the s-polarized component participating in the signal component is shaded, super resolution reproduction can be achieved.

Accordingly, an instance where the light shading plate 21 as described above is used to increase the p-polarized component is explained. In the magneto-optical head device with the structure as shown in FIG. 3, since the amount of light received is increased, the signal level becomes higher, and consequently the S/N of the reproduced signal is increased. However, since the central portion of light and other portion of light are separately subjected to photoelectric conversion, the amplitude of the p-polarized component of light transmitted through the central portion of the light shading plate 21 is not reflected in a in equation (1) shown above and thus a is not increased. In actual fact, in order to increase a in equation (1), it is necessary to optically superimpose the light of p-polarized component transmitted through the central portion of the light shading plate 21 and light containing the s-polarized component transmitted through the surrounding portion and then subject the resulting light to photoelectric conversion in the photodiodes 22 and 23. Therefore, the following description will explain a practical magneto-optical head device which allows the light transmitted through the central portion of the light shading plate 21 to be reflected in a in equation (1), thereby increasing a of the signal component.

Figure 8:
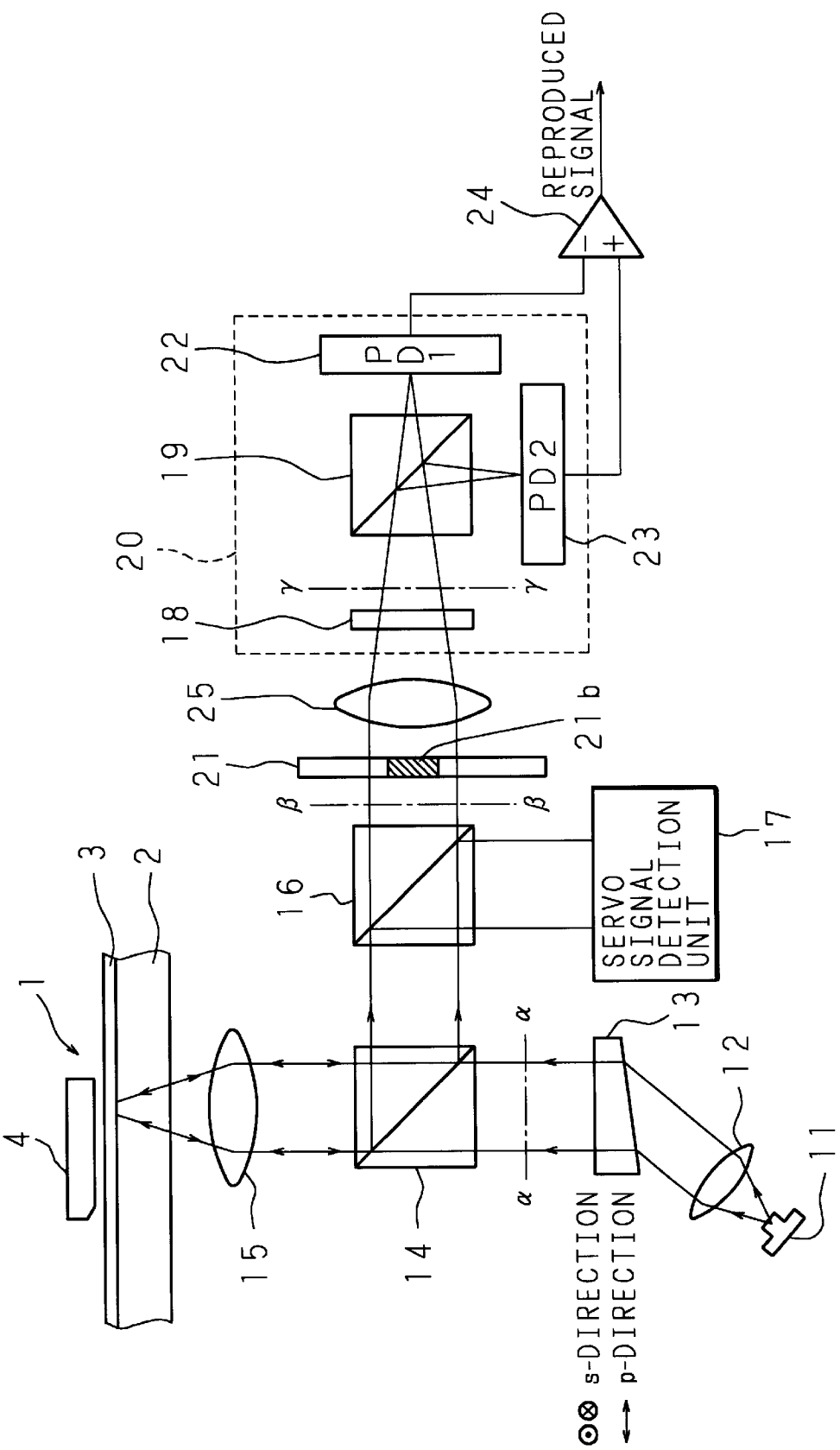
FIG. 8 is a structural view of another magneto-optical head device according to the present embodiment.

FIG. 8 is a structural view of a magneto-optical head device obtained by further improving the device shown in FIG. 3. A condenser lens 25 is provided between the light shading plate 21 and the ½ wave plate 18. Since other configuration is the same as that shown in FIG. 3, the corresponding parts are designated by the same reference numerals and the explanation thereof will be omitted. The light transmitted through the light shading plate 21 is condensed by the condenser lens 25, and light of the p-polarized component transmitted through the central portion of the light shading plate 21 and light containing the s-polarized component transmitted through the surrounding portion are optically superimposed and received by the photodiodes 22 and 23, respectively. The signals obtained by the photoelectric conversion in the photodiodes 22 and 23 become the reproduced signal expressed by equation (1) shown above, and the light of p-polarized component transmitted through the central portion of the light shading plate 21 is reflected in a, so that a is increased.

Thus, in the magneto-optical head device shown in FIG. 8, when the laser light to be irradiated on the magneto-optical disk 1, i.e., the irradiation path laser light, is the p-polarized component, the s-polarized component participating in the super resolution effect is shaded and only the p-polarized component which is not a signal component is transmitted in the central portion of the reflected light, the reproduced signal itself is magnified, and the S/N is improved. Moreover, since the s-polarized component participating in the super resolution effect is shaded in the conventional manner, it is possible to achieve super resolution reproduction with high resolution.

Figure 9:
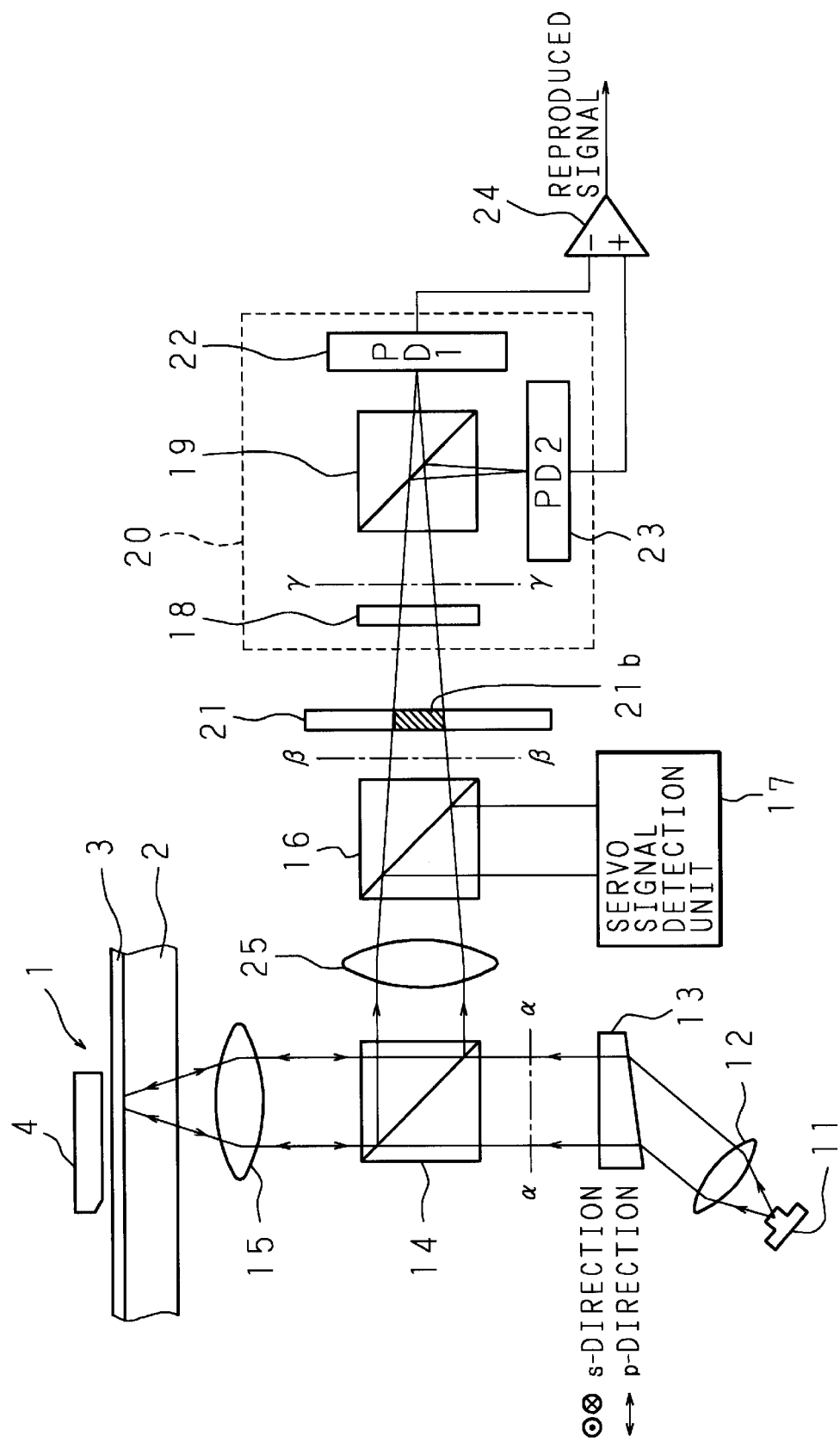
FIG. 9 is a structural view of a magneto-optical head device according to another embodiment.
Figure 10:
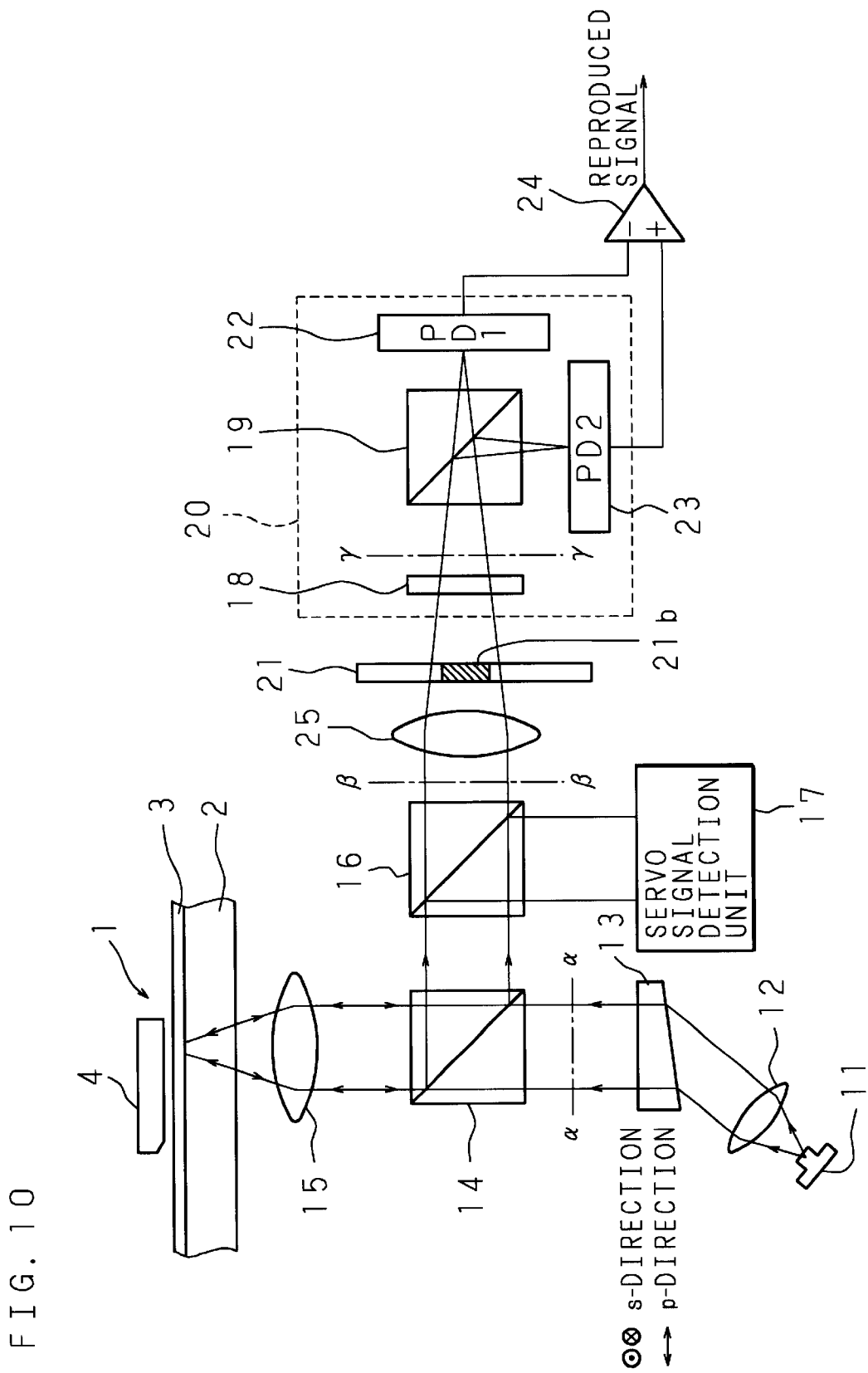
FIG. 10 is a structural view of a magneto-optical head device according to another embodiment.
Figure 11:
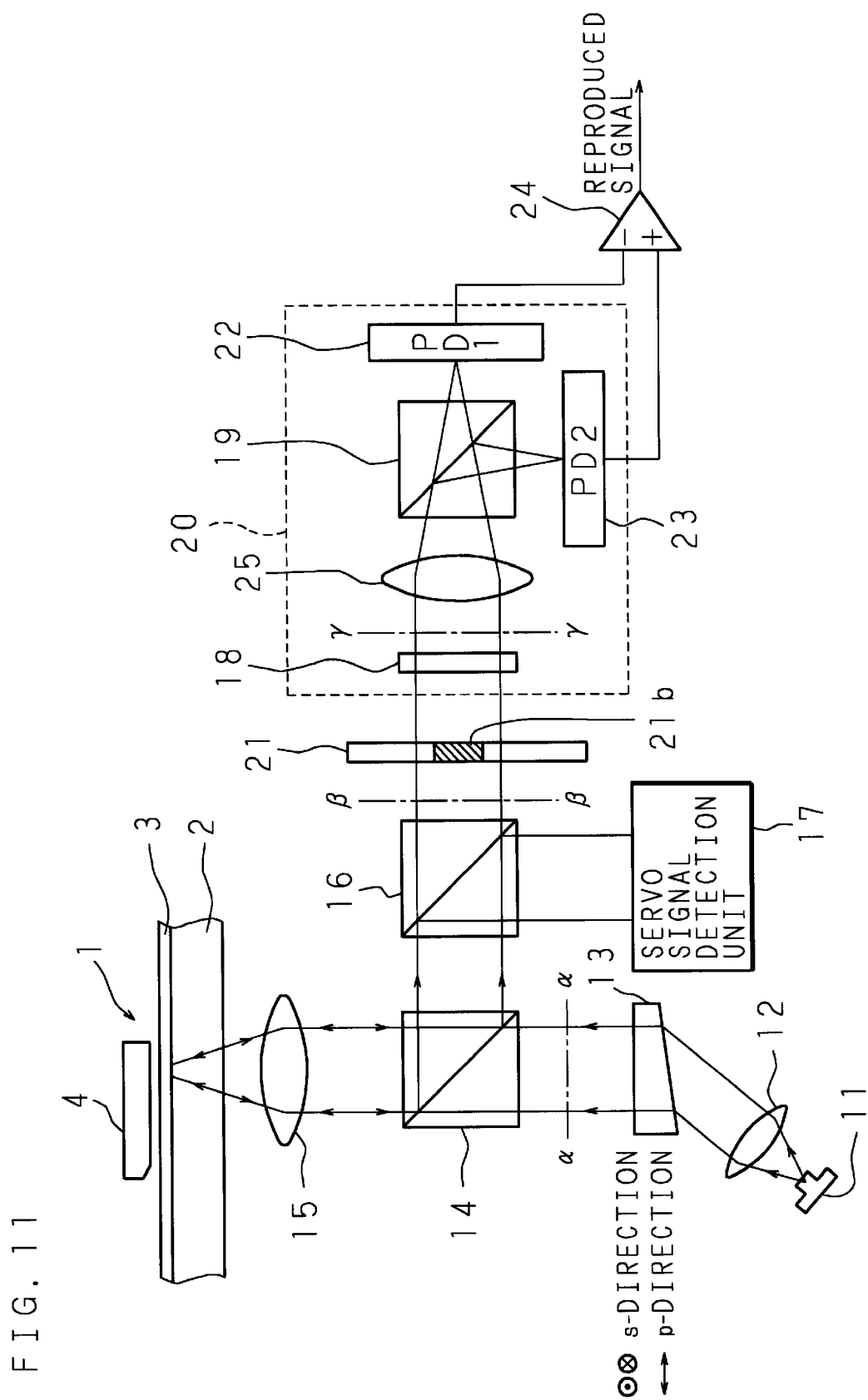
FIG. 11 is a structural view of a magneto-optical head device according to another embodiment.
Figure 12:
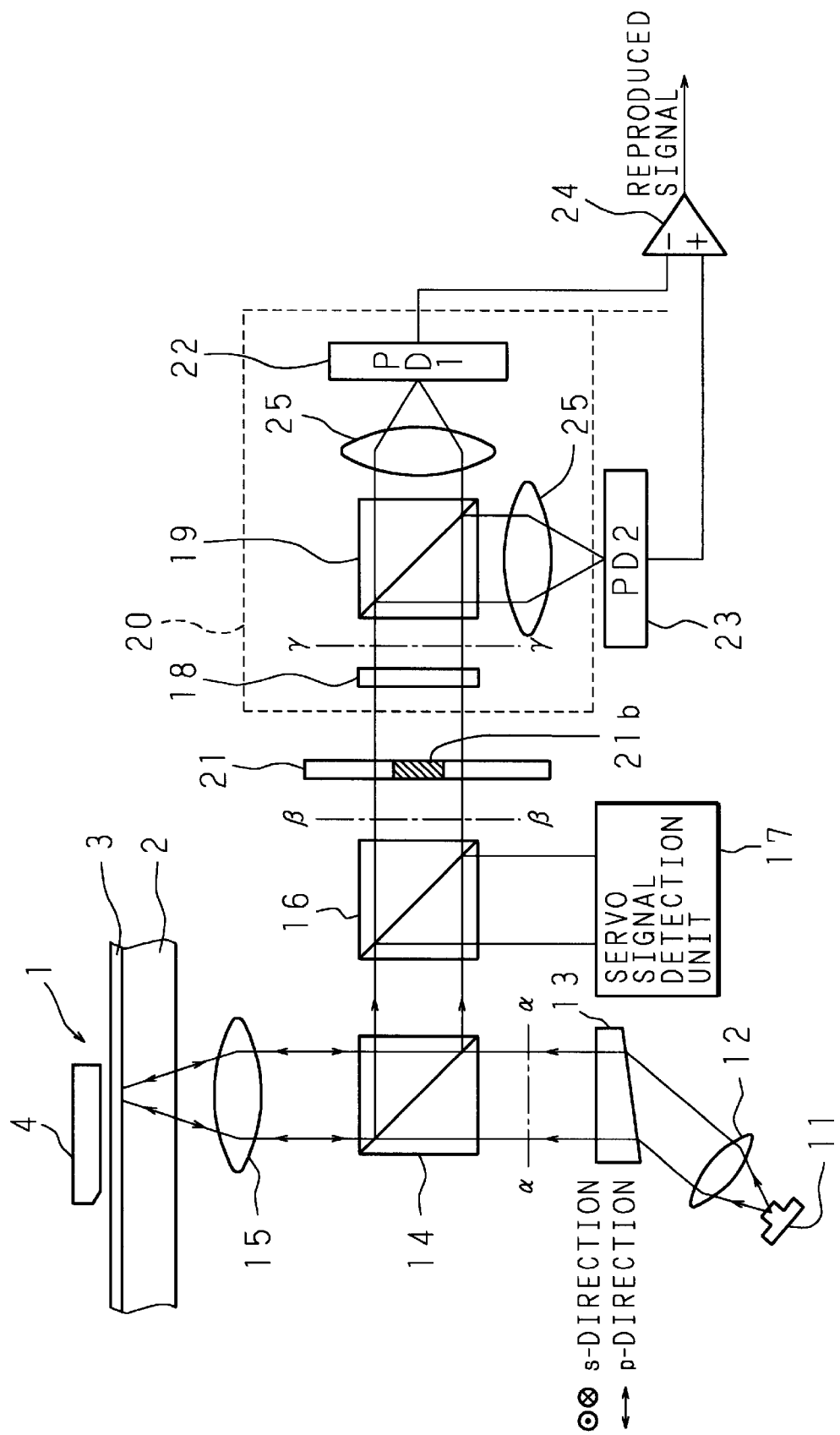
FIG. 12 is a structural view of a magneto-optical head device according to another embodiment

Besides, the position of the condenser lens 25 for condensing the light transmitted through the light shading plate 21 on the photodiodes 22 and 23 is not necessarily limited between the light shading plate 21 and the ½ wave plate 18, and thus the condenser lens 25 may be positioned between the first and second beam splitters 14 and 16 as shown in FIG. 9, between the second beam splitter 16 and the light shading plate 21 as shown in FIG. 10, or between the ½ wave plate 18 and the polarization beam splitter 19 as shown in FIG. 11. Furthermore, as shown in FIG. 12, two pieces of condenser lenses may be used so that one is positioned between the polarization beam splitter 19 and the photodiode 22 and the other is positioned between the polarization beam splitter 19 and the photodiode 23.

In the above-described embodiment of the magneto-optical head, although the light shading plate 21 is positioned just before the ½ wave plate 18, the position of the light shading plate is not necessarily limited to such a location. The following description will explain another embodiment in which the light shading plate is positioned at a different location.

Figure 13:
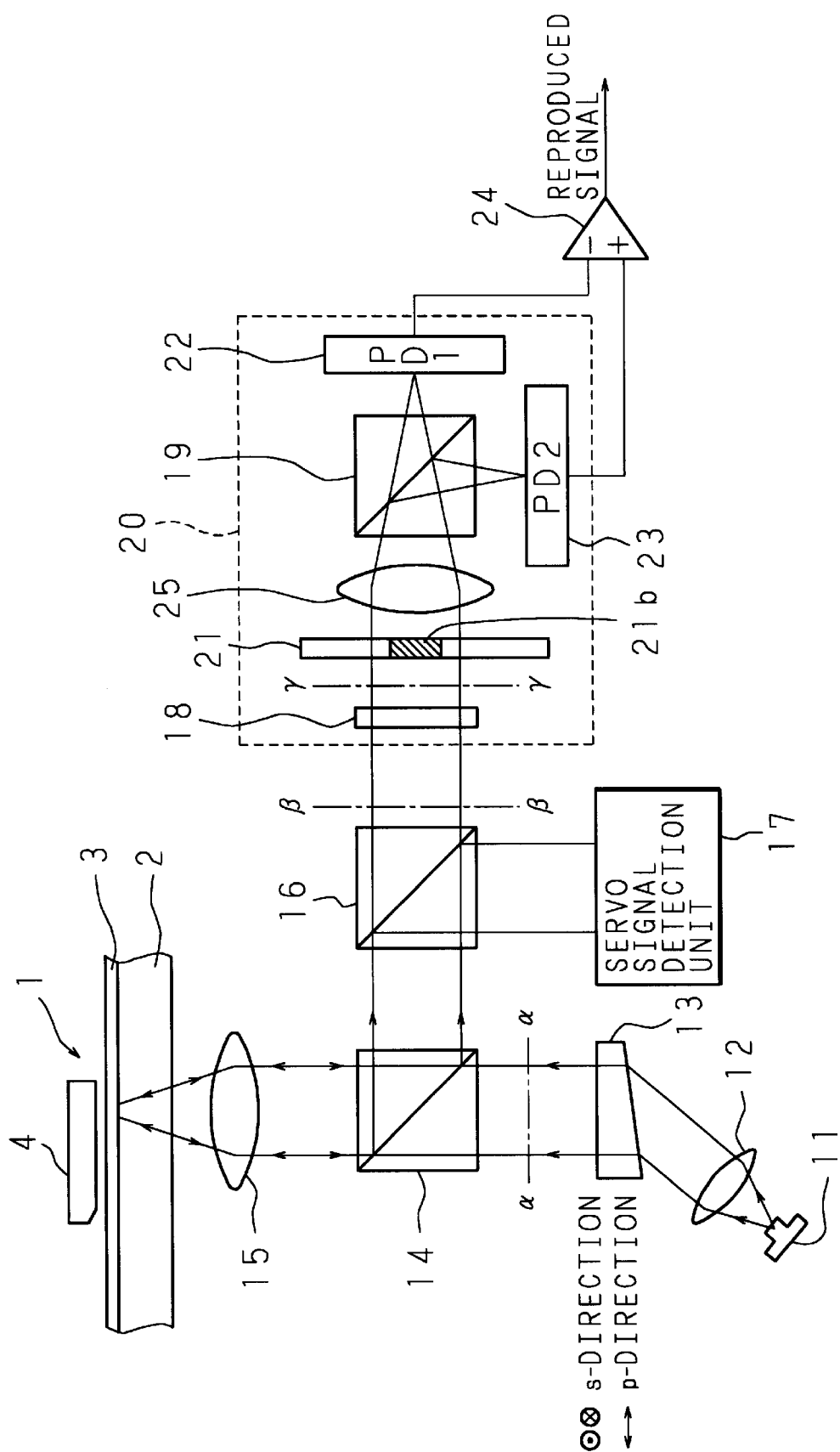
FIG. 13 is a structural view of a magneto-optical head device according to another embodiment.

FIG. 13 is a structural view of a magneto-optical head device according to another embodiment of the present invention. The light shading plate 21 and the condenser lens 25 are provided between the ½ wave plate 18 and the polarization beam splitter 19, so that the ½ wave plate 18, light shading plate 21, condenser lens 25 and polarization beam splitter 19 are arranged in this order. Parallel rays whose polarization direction has been rotated at 45 degrees by the ½ wave plate 18 transmit through the light shading plate 21, and the signal component is shaded in substantially the central portion. The transmitted light is condensed to incide on the polarization beam splitter 19, and then received by the photodiodes 23 and 24. In order to receive the parallel rays from the ½ wave plate 18, the light shading plate 21 is positioned in such a state that the light shading plate 21 shown in FIG. 4 is rotated at 45 degrees in a plane. Since other configuration is the same as that of the magneto-optical head device shown in FIG. 3, the same parts are designated by the same reference numerals and the explanation thereof will be omitted.

In the magneto-optical head device with such a structure, since the same function as the light shading plate 21 shown in FIG. 3, i.e., shading the signal component participating in the super resolution effect and transmitting only the p-polarized component which is not a signal component, is performed, the same effects as those of the above-described magneto-optical head device can be obtained.

Figure 14:
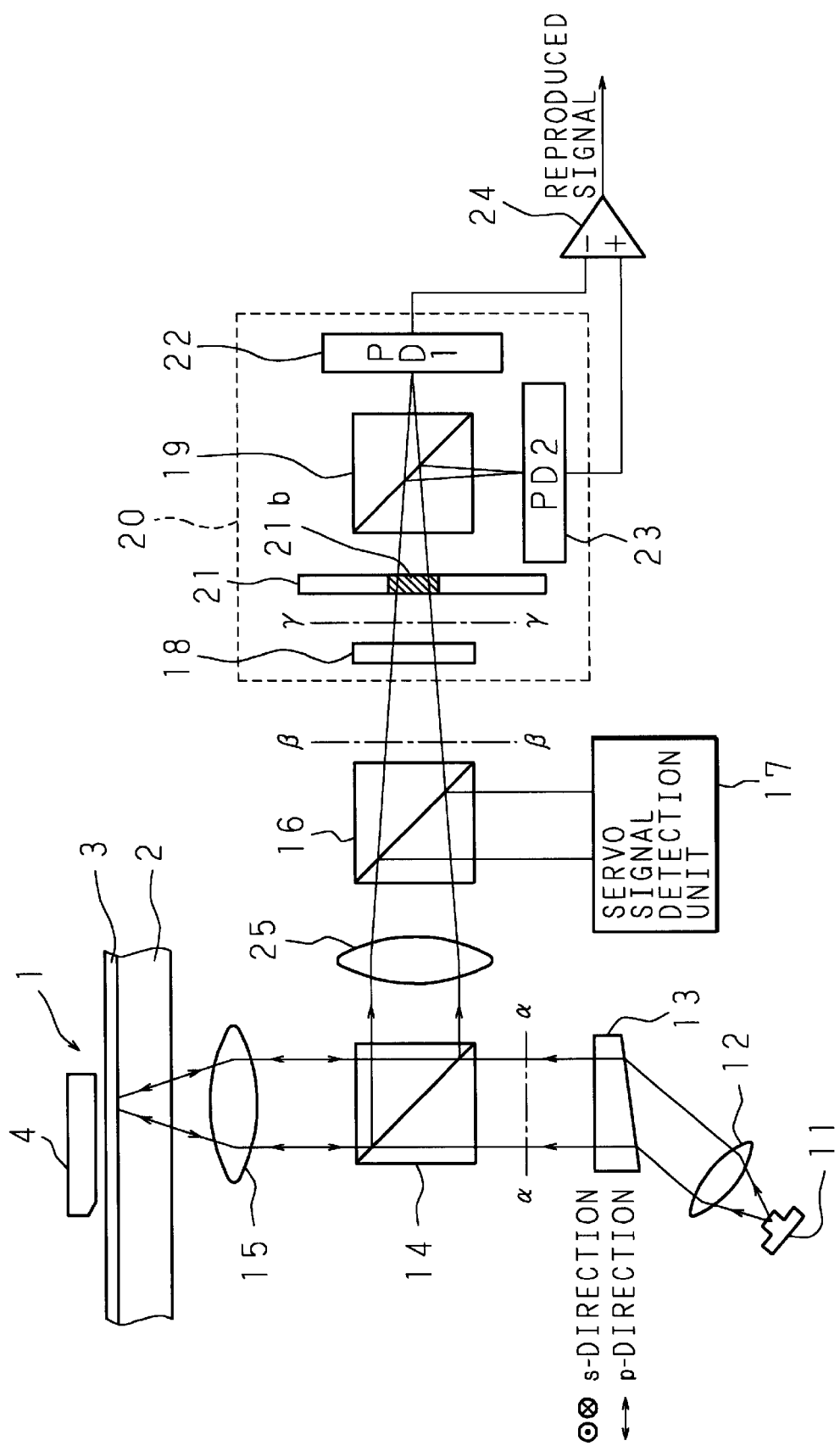
FIG. 14 is a structural view of a magneto-optical head device according to another embodiment.
Figure 15:
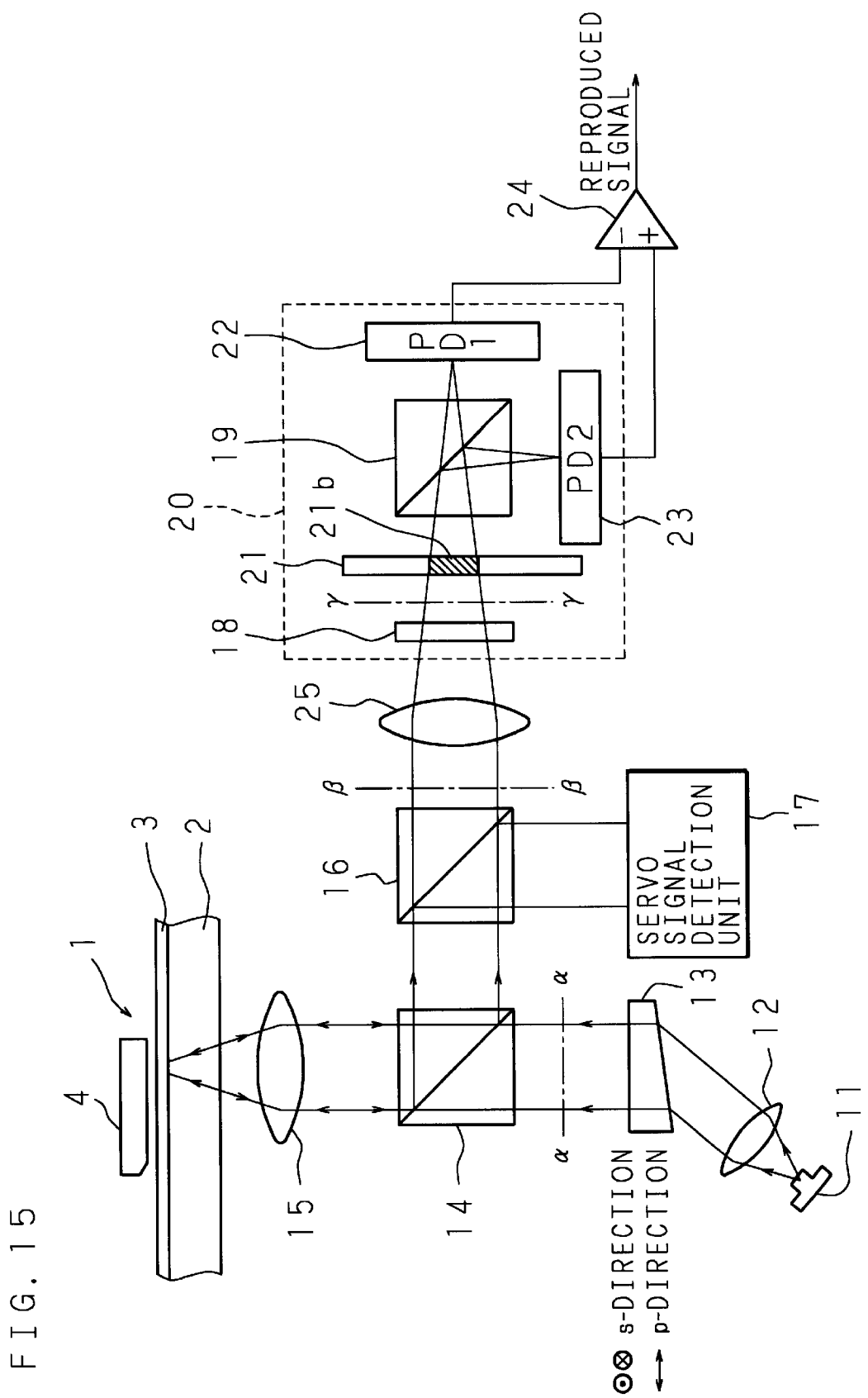
FIG. 15 is a structural view of a magneto-optical head device according to another embodiment.
Figure 16:
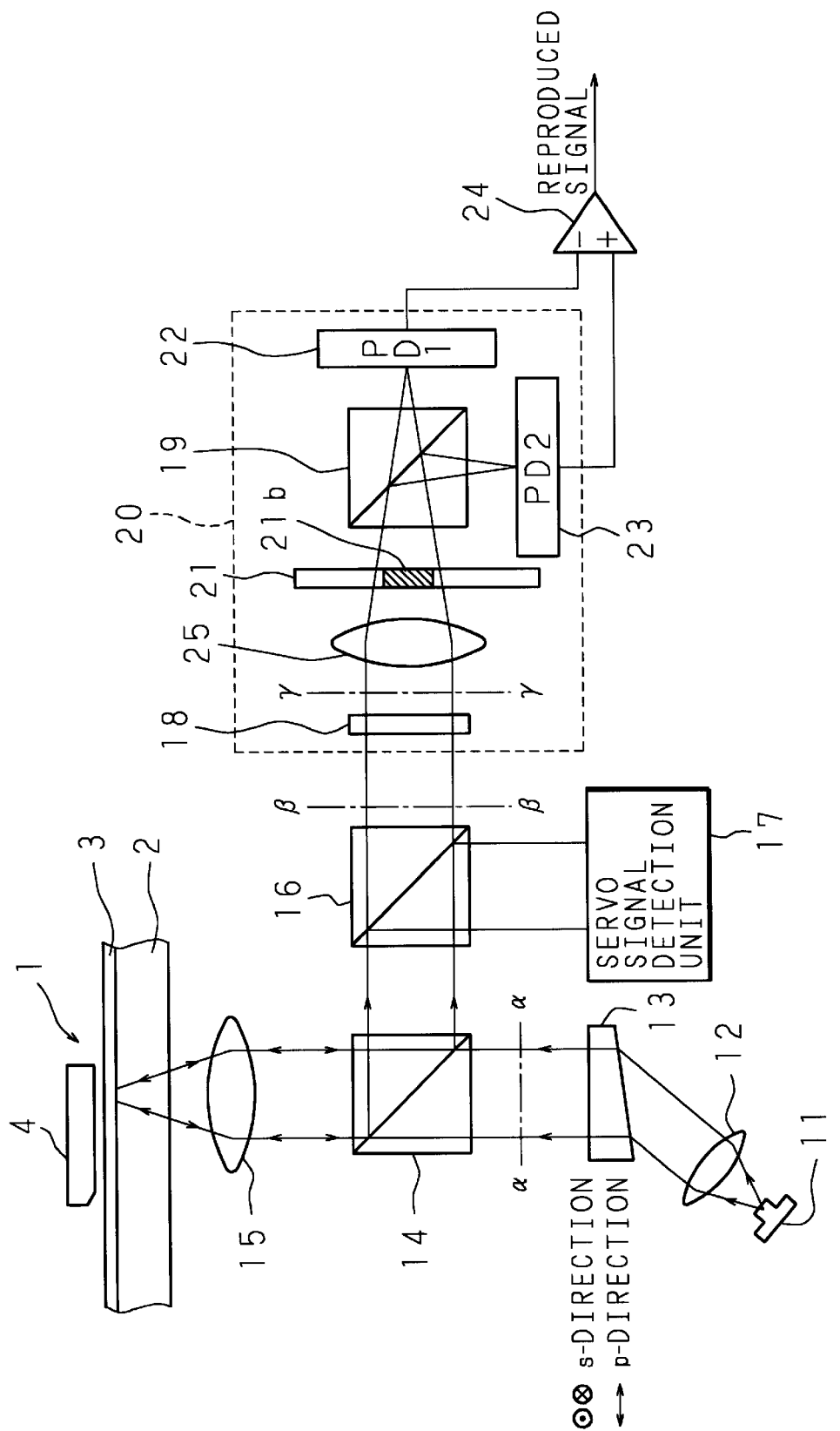
FIG. 16 is a structural view of a magneto-optical head device according to another embodiment.
Figure 17:
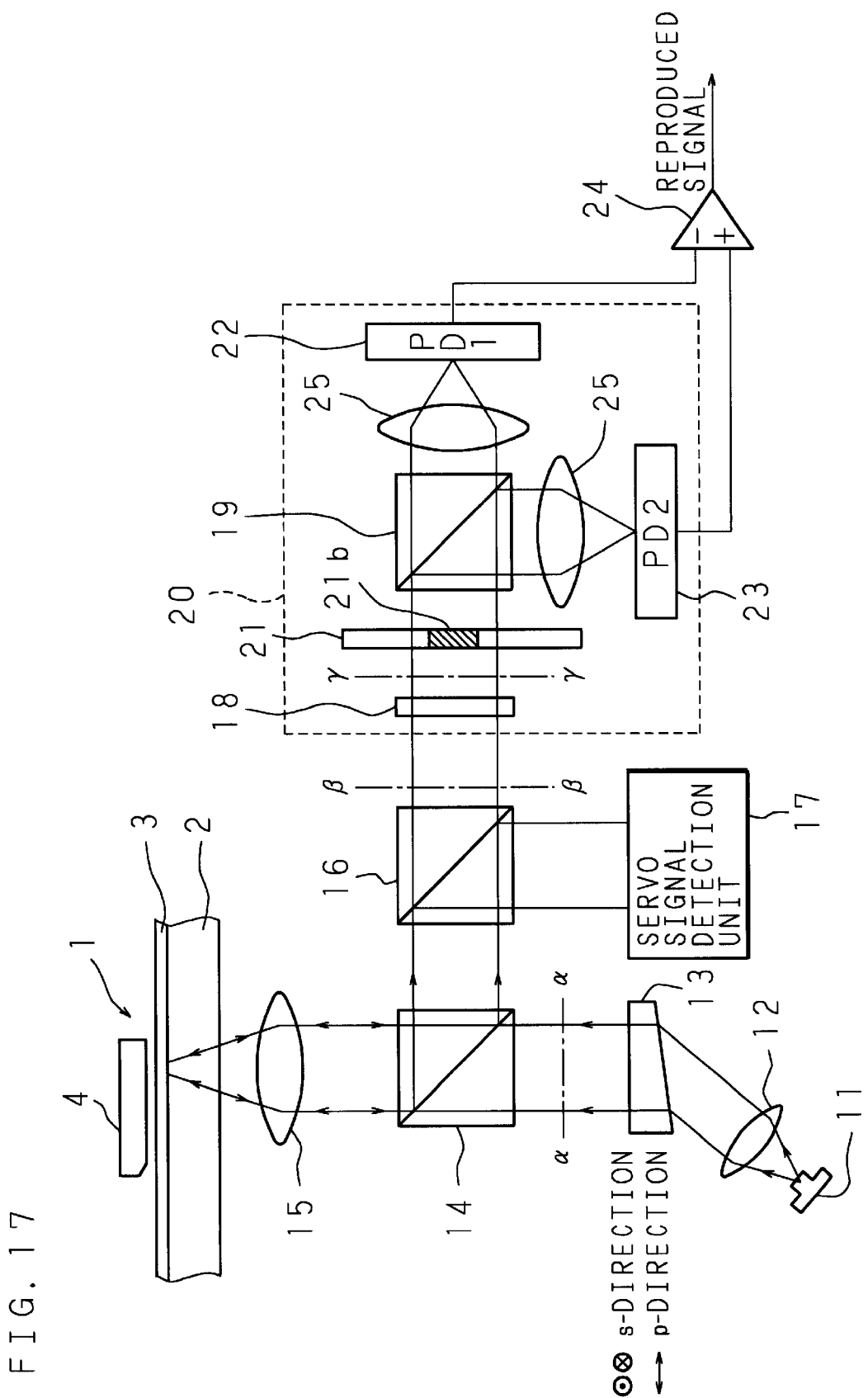
FIG. 17 is a structural view of a magneto-optical head device according to another embodiment.

Besides, the position of the condenser lens 25 for condensing the light transmitted through the light shading plate 21 on the photodiodes 22 and 23 is not necessarily limited between the light shading plate 21 and the polarization beam splitter 19. For instance, the condenser lens 25 may be positioned between the first and second beam splitters 14 and 16 as shown in FIG. 14, between the second beam splitter 16 and the ½ wave plate 18 as shown in FIG. 15, or between the ½ wave plate 18 and the light shading plate 21 as shown in FIG. 16. Furthermore, as shown in FIG. 17, two pieces of condenser lenses may be used so that one is positioned between the polarization beam splitter 19 and the photodiode 22 and the other is arranged between the polarization beam splitter 19 and the photodiode 23.

Figure 18:
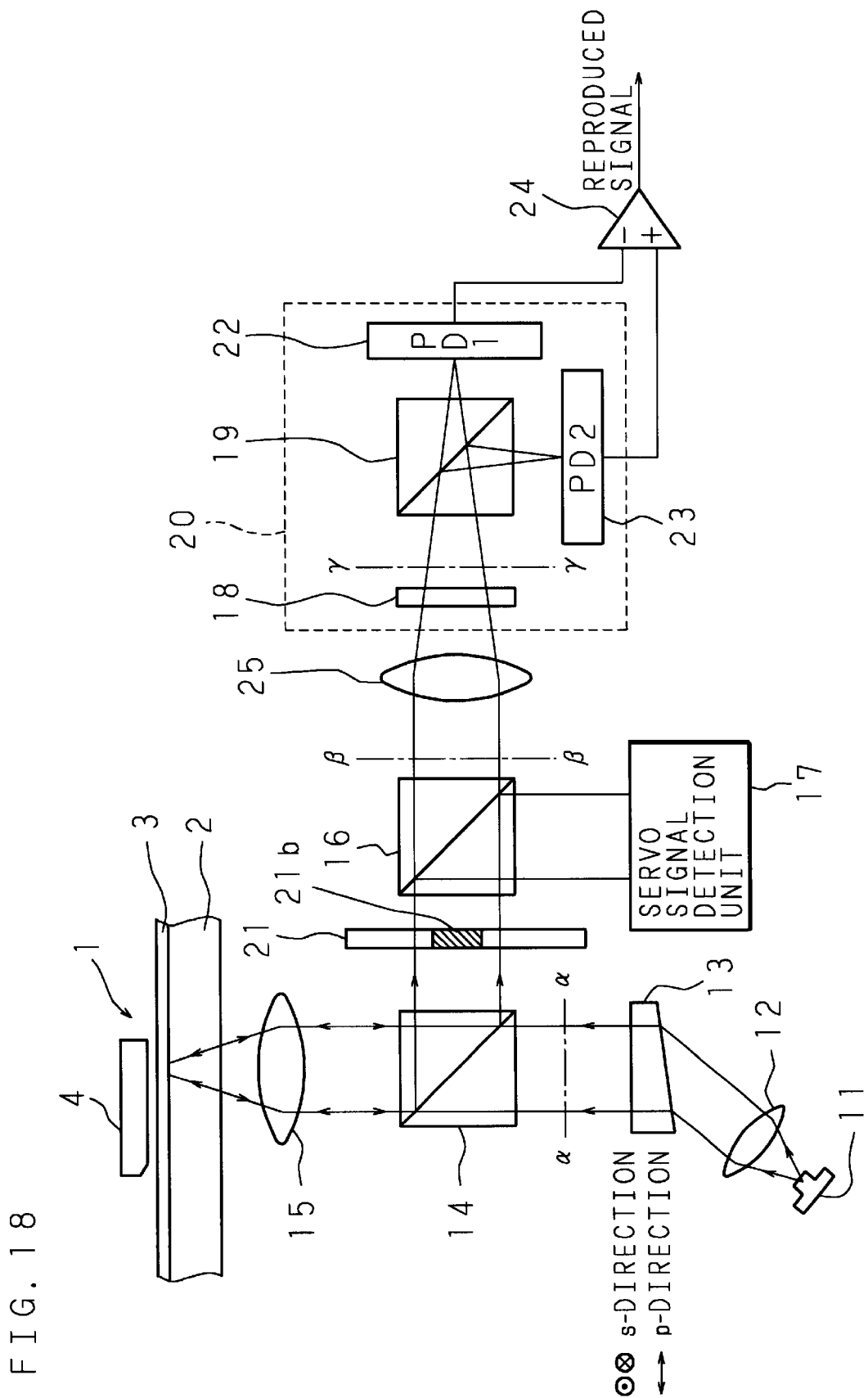
FIG. 18 is a structural view of a magneto-optical head device according to another embodiment.

FIG. 18 is a structural view of a magneto-optical head device according to still another embodiment of the present invention. The light shading plate 21 is provided between the first beam splitter 14 and the second beam splitter 16, and the condenser lens 25 is provided between the second beam splitter 16 and the ½ wave plate 18. Parallel rays reflected by the first beam splitter 14 transmit through the light shading plate 21 with the s-polarized component being shaded in substantially the central portion, and incide on the second beam splitter 16. The parallel rays supplied from the second beam splitter 16 to the reproduced signal detection system 20 are condensed by the condenser lens 25 to incide on the ½ wave plate 18, and then received by the photodiodes 23 and 24. Since other configuration is the same as that of the magneto-optical head device shown in FIG. 3, the same parts are designated by the same reference numerals and the explanation thereof will be omitted.

In the magneto-optical head device with such a structure, since the same function as the light shading plate 21 shown in FIG. 3, i.e., shading the s-polarized component participating in the super resolution effect and transmitting only the p-polarized component which is not a signal component, is performed, the same effects as those of the above-described magneto-optical head device can be obtained.

Figure 19:
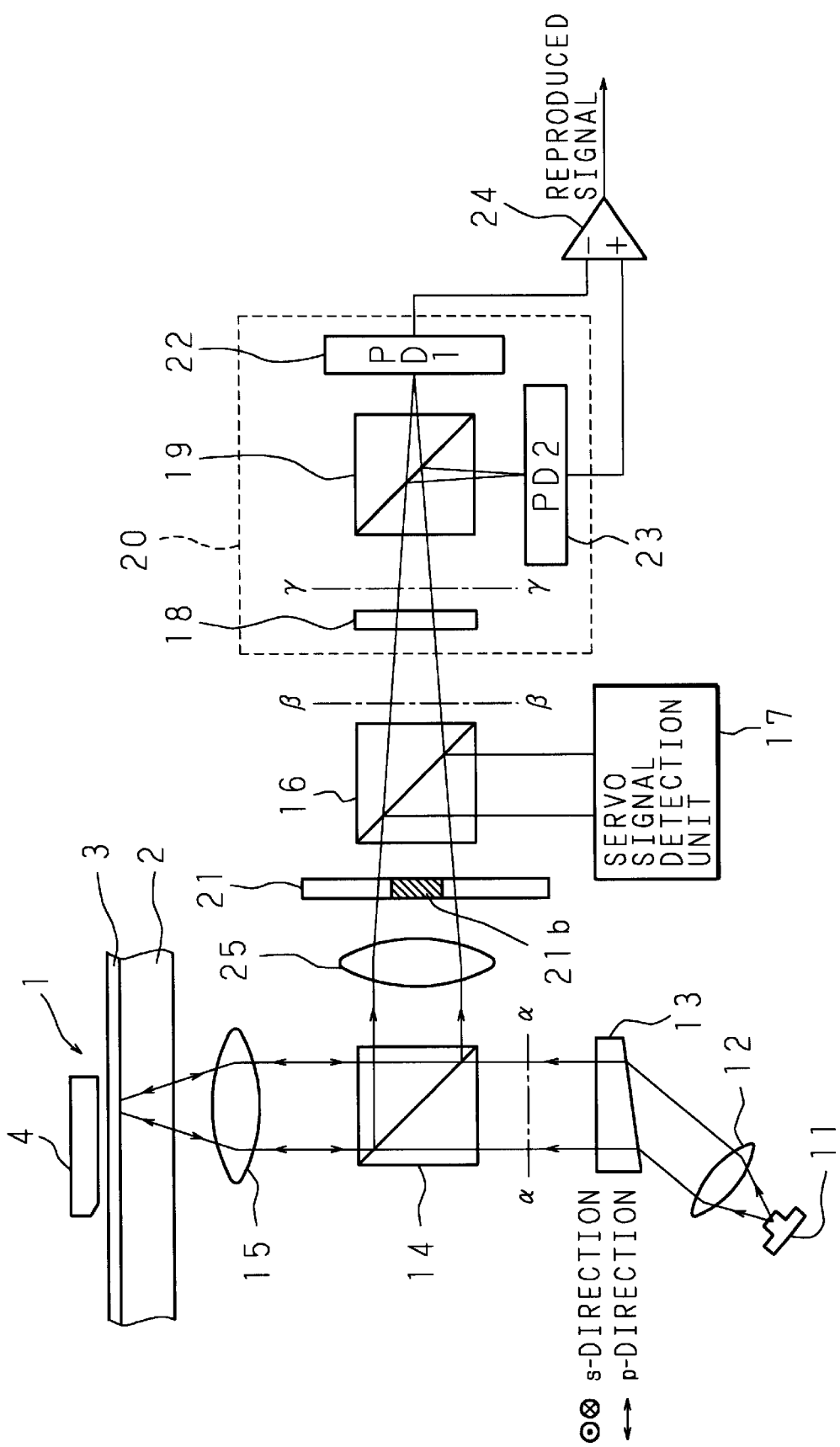
FIG. 19 is a structural view of a magneto-optical head device according to another embodiment.
Figure 20:
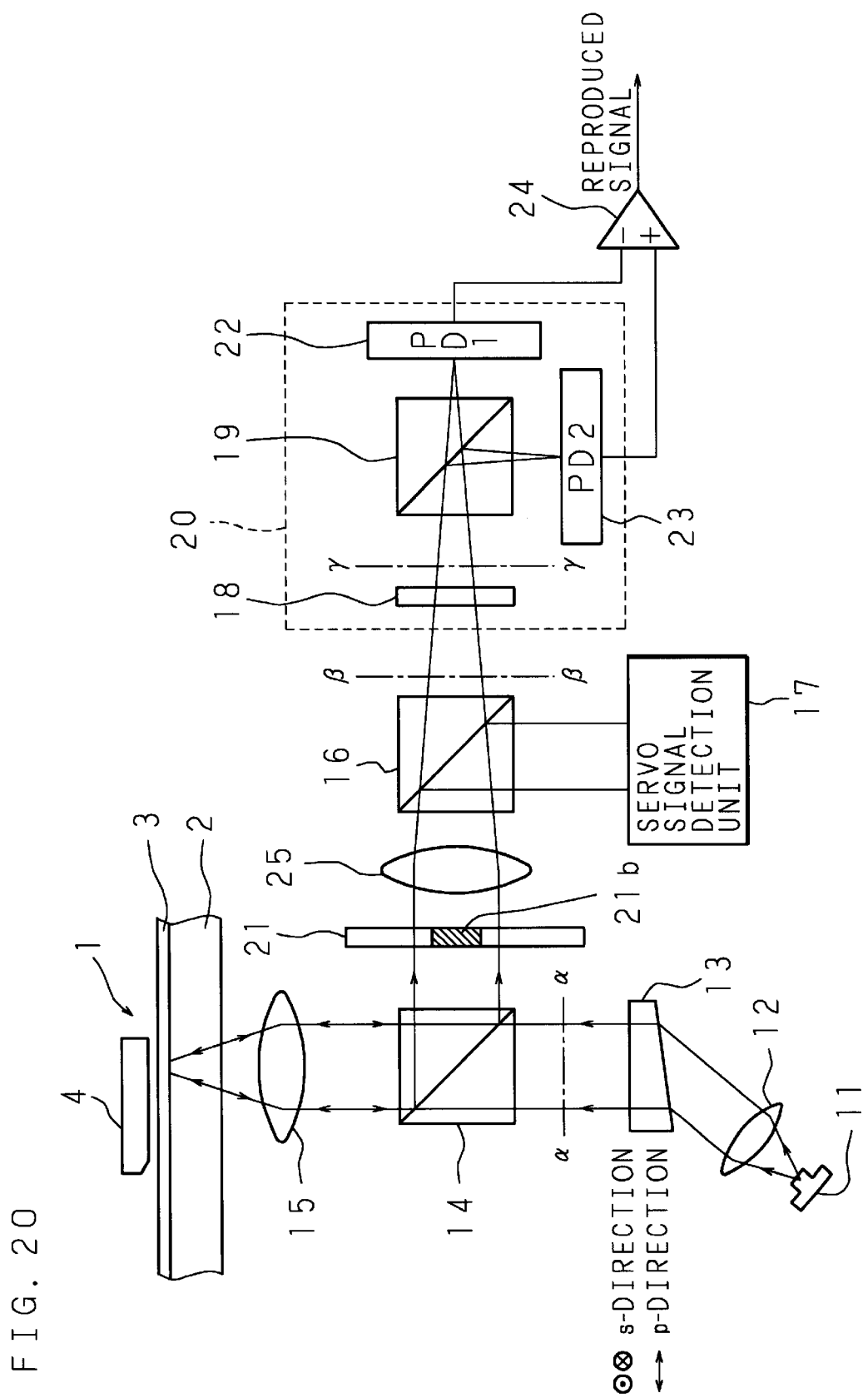
FIG. 20 is a structural view of a magneto-optical head device according to another embodiment.
Figure 21:
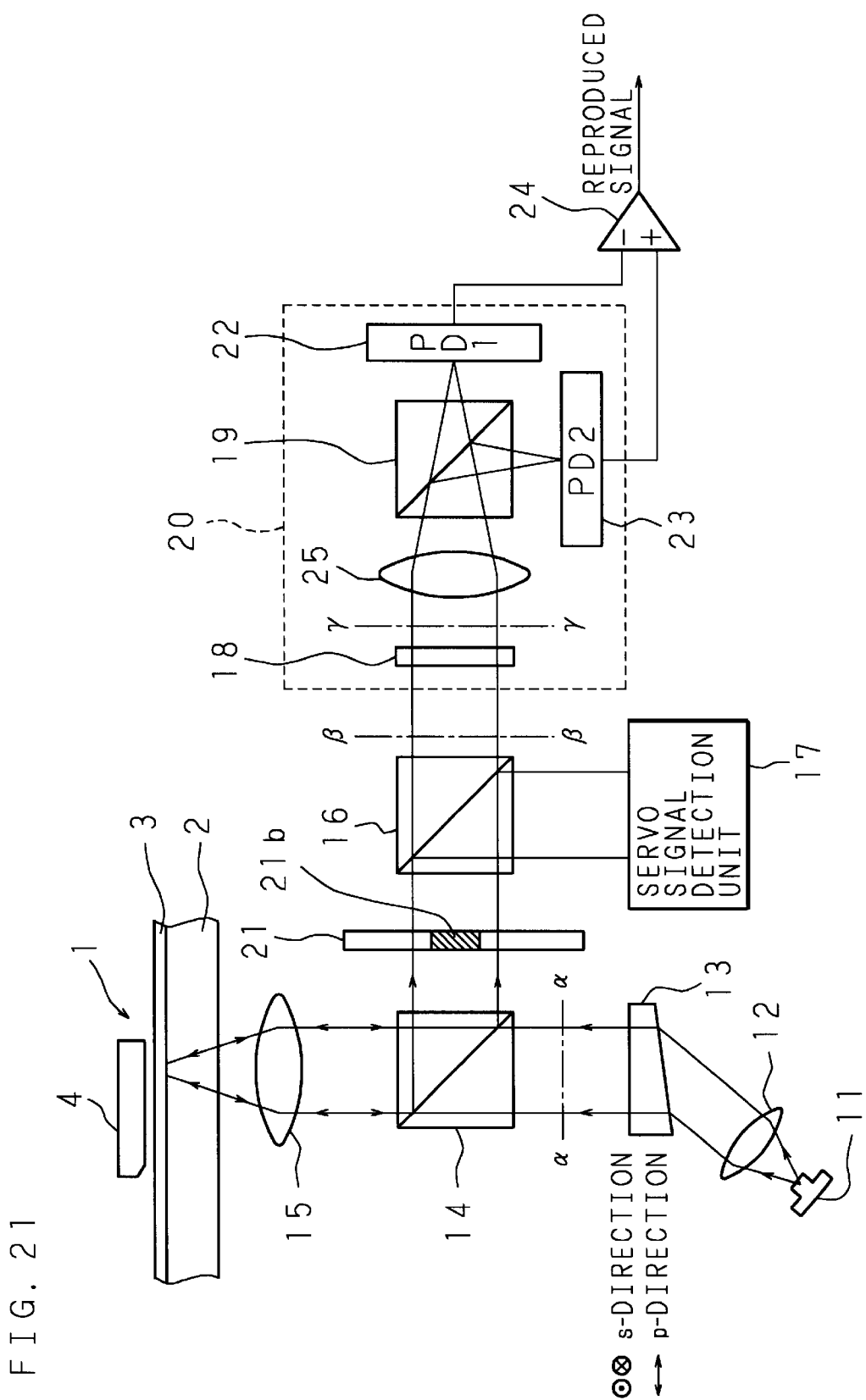
FIG. 21 is a structural view of a magneto-optical head device according to another embodiment.
Figure 22:
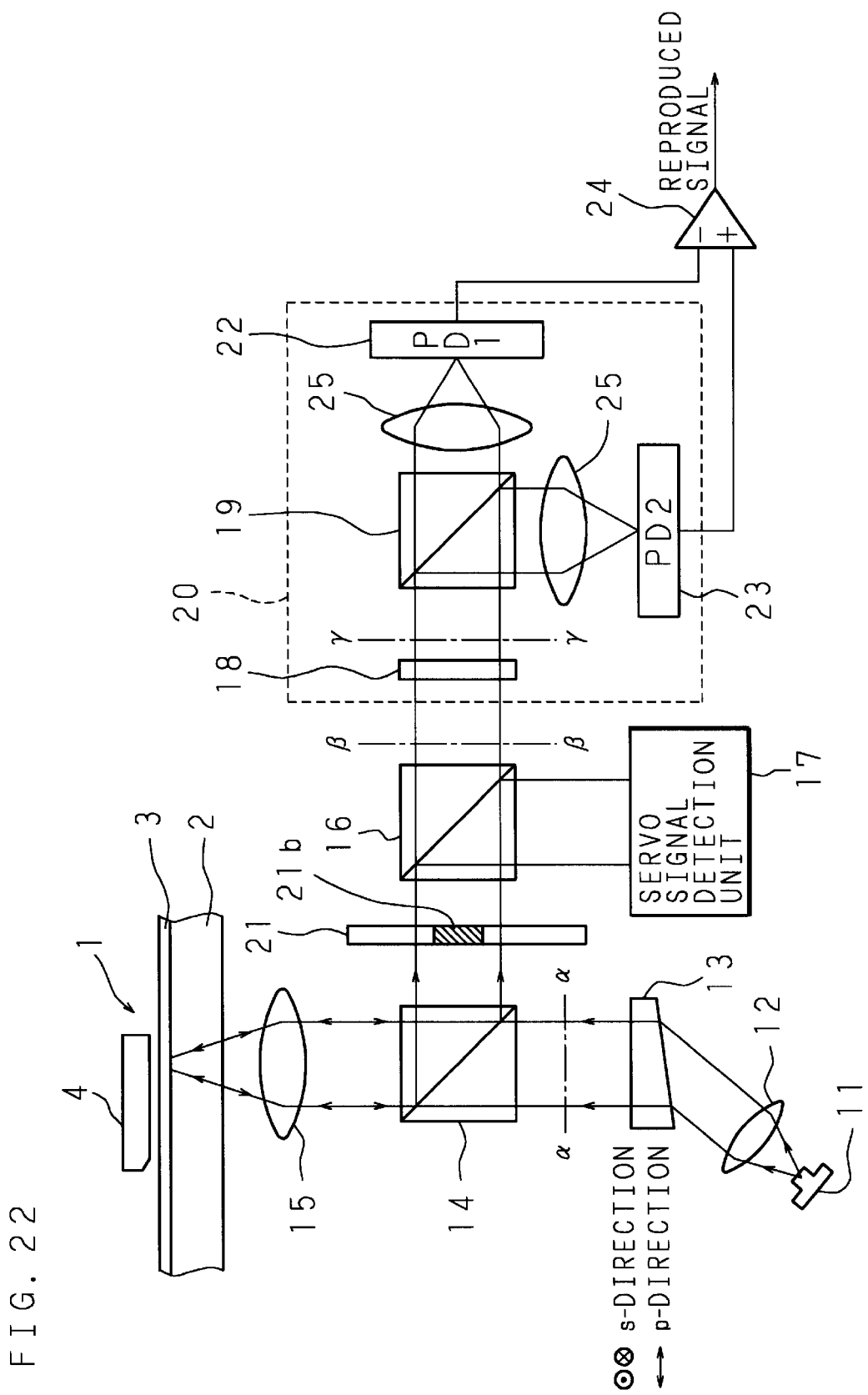
FIG. 22 is a structural view of a magneto-optical head device according to another embodiment.

Besides, the position of the condenser lens 25 for condensing the light transmitted through the light shading plate 21 on the photodiodes 22 and 23 is not necessarily limited between the second beam splitter 16 and the ½ wave plate 18. For instance, the condenser lens 25 may be positioned between the first beam splitter 14 and the light shading plate 21 as shown in FIG. 19, between the light shading plate 21 and the second beam splitter 16 as shown in FIG. 20, or between the ½ wave plate 18 and the polarization beam splitter 19 as shown in FIG. 21. Furthermore, as shown in FIG. 22, two pieces of condenser lenses may be used so that one is positioned between the polarization beam splitter 19 and the photodiode 22 and the other is arranged between the polarization beam splitter 19 and the photodiode 23.

Figure 23:
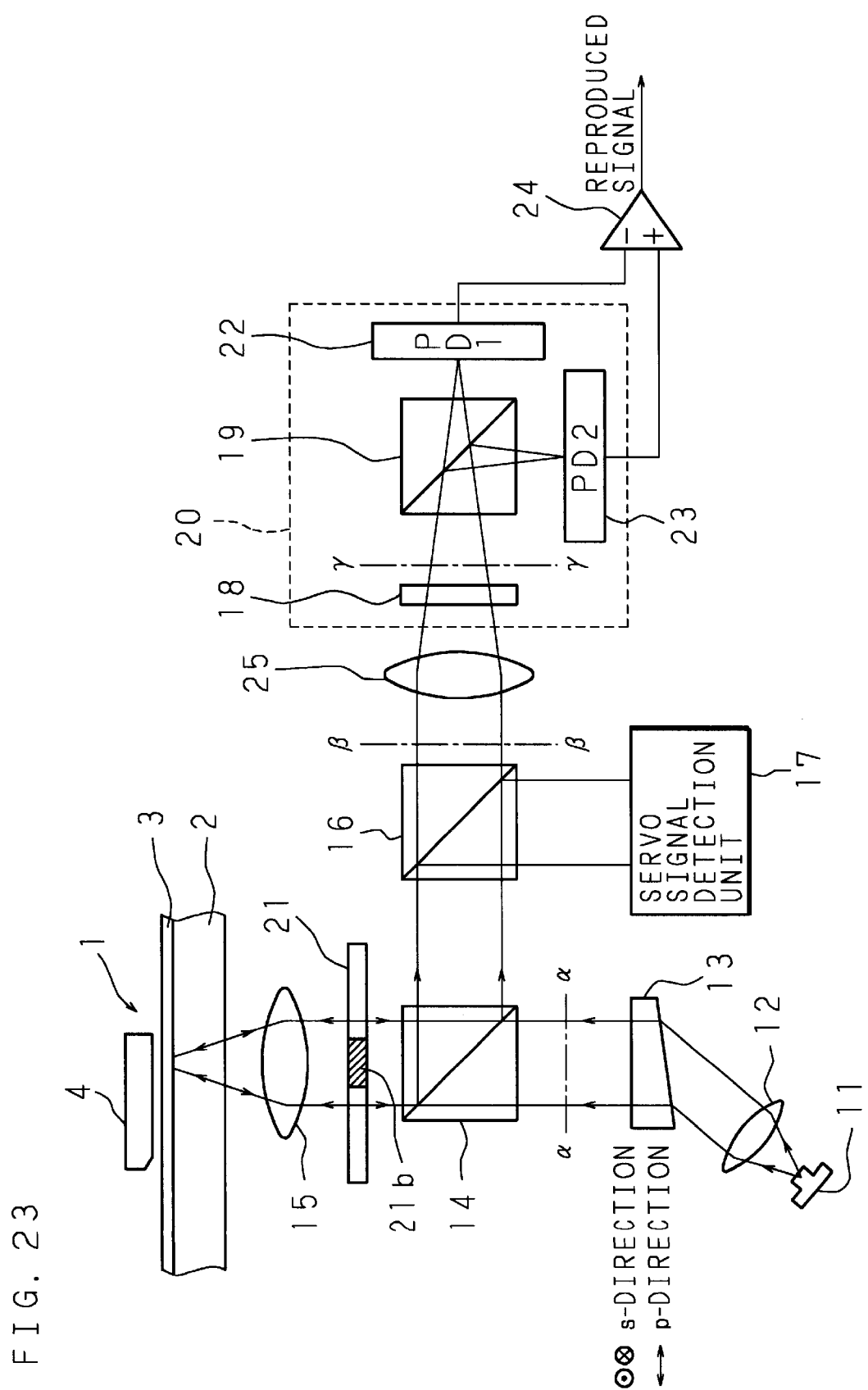
FIG. 23 is a structural view of a magneto-optical head device according to another embodiment.

In addition, FIG. 23 is a structural view of a magneto-optical head device according to still another embodiment of the present invention. The light shading plate 21 is provided between the first beam splitter 14 and the objective lens 15, and the condenser lens 25 is provided between the second beam splitter 16 and the ½ wave plate 18. After reflected light from the magneto-optical disk 1 is made parallel rays by the objective lens 15, the parallel rays transmit through the light shading plate 21 with the s-polarized component being shaded in substantially the central portion, and are reflected by the first beam splitter 14 to incide on the second beam splitter 16. The parallel rays supplied from the second beam splitter 16 to the reproduced signal detection system 20 are condensed by the condenser lens 25 to incide on the ½ wave plate 18, and then received by the photodiodes 23 and 24. Since other configuration is the same as that of the magneto-optical head device shown in FIG. 3, the same parts are designated by the same reference numerals and the explanation thereof will be omitted. Besides, although the irradiation path laser light emitted from the semiconductor laser light source 11 also transmits through the light shading plate 21, since the light shading plate 21 transmits the p-polarized component, the irradiation path laser light as p-polarized light is transmitted, thereby causing no problems.

In the magneto-optical head device with such a structure, since the same function as the light shading plate 21 shown in FIG. 3, i.e., shading the s-polarized component participating in the super resolution effect and transmitting only the p-polarized component which is not a signal component, is performed, the same effects as those of the above-described magneto-optical head device can be obtained.

Figure 24:
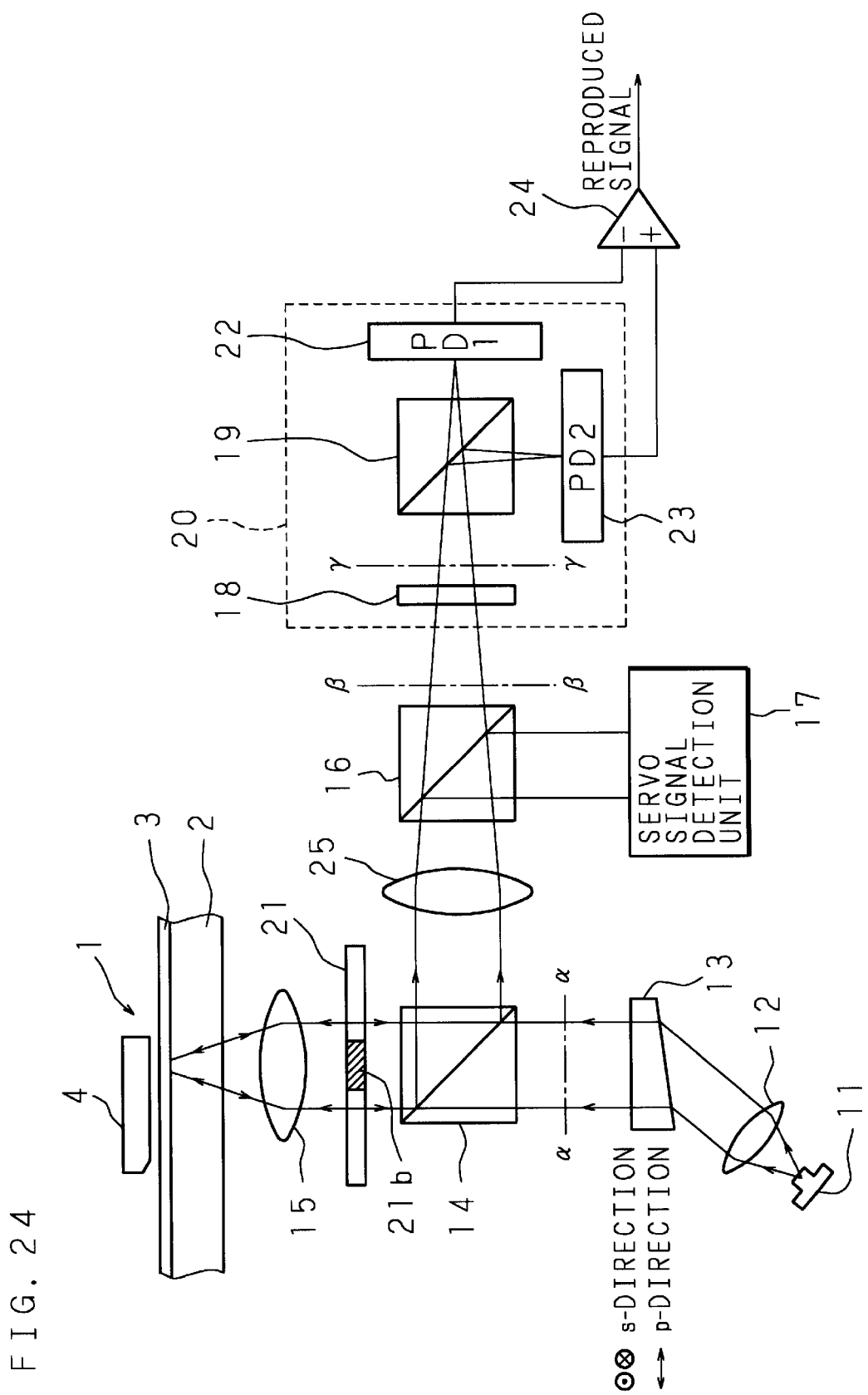
FIG. 24 is a structural view of a magneto-optical head device according to another embodiment.
Figure 25:
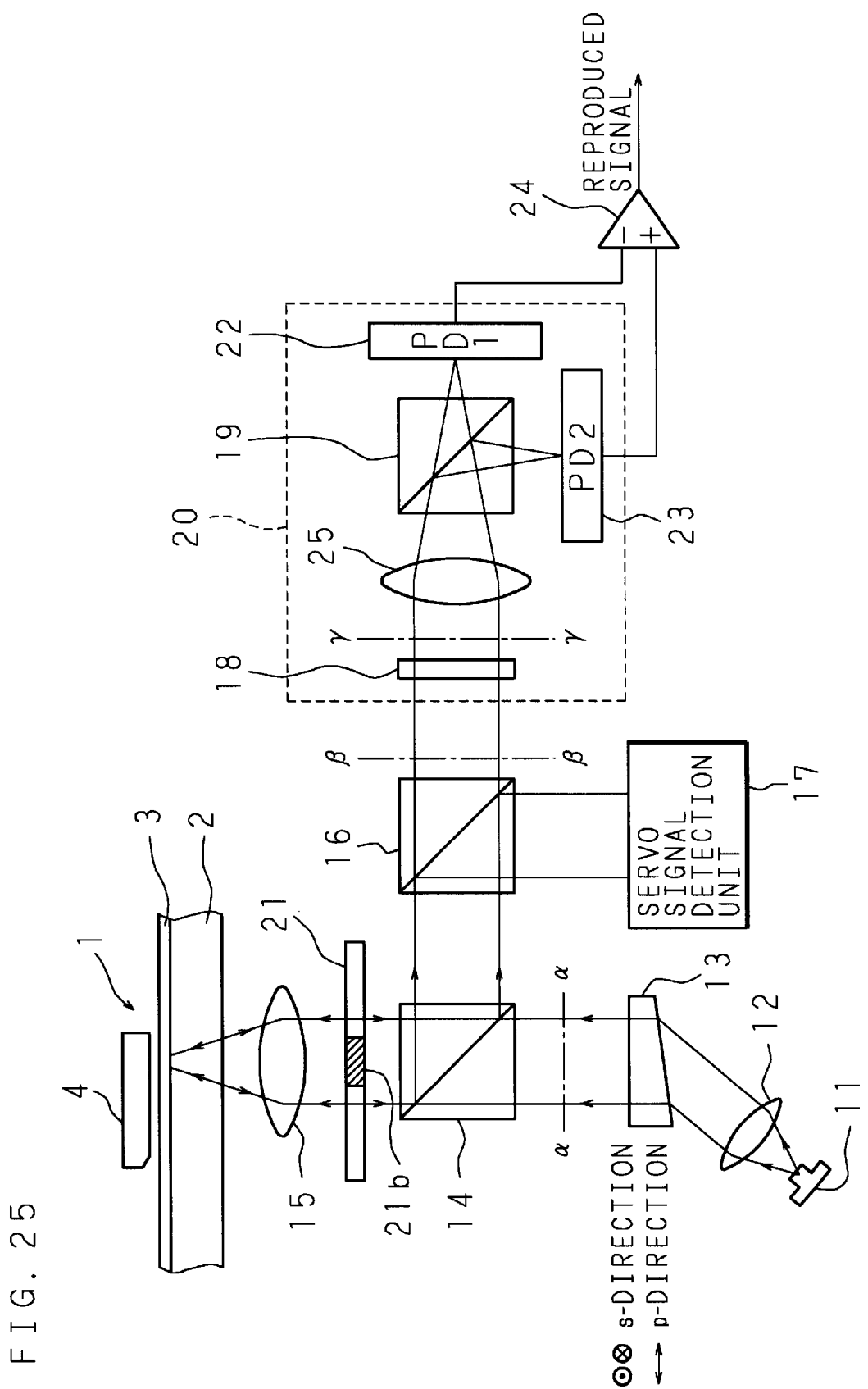
FIG. 25 is a structural view of a magneto-optical head device according to another embodiment.
Figure 26:
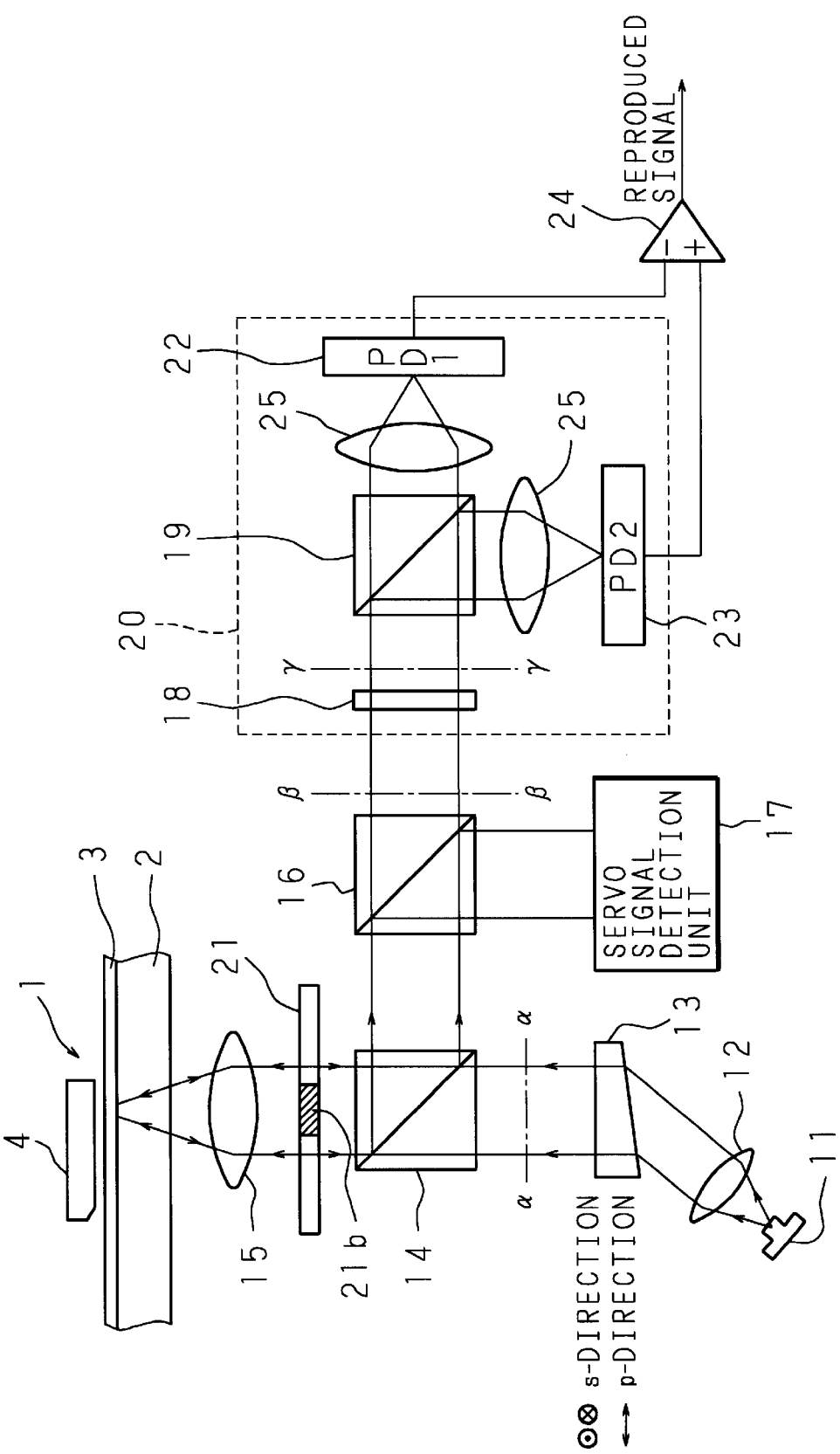
FIG. 26 is a structural view of a magneto-optical head device according to another embodiment.

Besides, the position of the condenser lens 25 for condensing the light transmitted through the light shading plate 21 on the photodiodes 22 and 23 is not necessarily limited between the second beam splitter 16 and the ½ wave plate 18. For instance, the condenser lens 25 may be positioned between the first and second beam splitters 14 and 16 as shown in FIG. 24, or between the ½ wave plate 18 and the polarization beam splitter 19 as shown in FIG. 25. Furthermore, as shown in FIG. 26, two pieces of condenser lenses may be used so that one is positioned between the polarization beam splitter 19 and the photodiode 22 and the other is arranged between the polarization beam splitter 19 and the photodiode 23.

Figure 27:
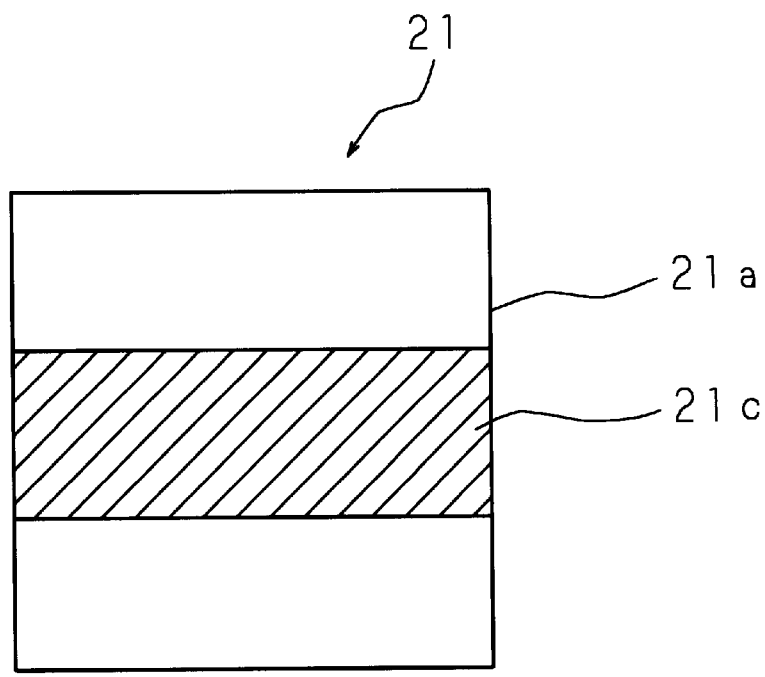
FIG. 27 is a plan view of a light shading plate according to another embodiment.

Incidentally, although the polarization film 21b of the above-mentioned light shading plate 21 has substantially a circular shape as shown in FIG. 4, it is not necessarily limited to this configuration if the polarization film is formed in a position that corresponds to substantially the central portion of the parallel rays transmitting through the light shading plate 21. FIG. 27 is a plan view of a light shading plate illustrating the structure of another light shading plate. The light shading plate 21 includes a transparent flat plate 21a and a polarization film 21c. The transparent flat plate 21a has substantially a rectangular shape in its plan view, and the belt-shaped polarization film 21c is formed at substantially the center of a surface of the transparent flat plate 21a. With the use of the light shading plate 21 having such a structure, the same effects as those of the above-described magneto-optical head device can be obtained.

Moreover, although the above-described light shading plate 21 is formed by the transparent flat plate 21a and the polarization film 21c, it is not necessarily limited to such a configuration and may be composed only of the polarization film 21c. For instance, the polarization film 21c may be provided on the light emitting surface of the beam splitter or the ½ wave plate 18.

Furthermore, the above description explains the structures using a dielectric multilayer film which transmits substantially 100% of a component of a predetermined polarization direction and transmits substantially 0% of a component of other polarization direction, i.e., shades the component of other polarization direction, as the polarization film 21b or 21c of the above-described light shading plate 21. However, it is not necessarily to use such a dielectric multilayer film, and a film like a polarization plate having different transmittances according to the polarization directions may be used.

Additionally, in the above-explained magneto-optical head device, although the laser light of the irradiation path is the p-polarized light, the present invention is not necessarily limited to this and can also be applied to a device in which the irradiation path laser light is the s-polarized component. In this case, however, a light shading plate provided with a polarization film having a higher transmittance for the s-polarized component than for the p-polarized component is used, and the polarization direction-related structure for the p-polarized component and that for the s-polarized component are exchanged.

Besides, the above-described embodiments explain the structures in which the reflected light from the magneto-optical disk is made parallel rays by the objective lens and the parallel rays are transmitted through the light shading means. However, the present invention is not necessarily limited by the parallel rays, and can be carried out by, for example, a structure in which converging light to be converged on the reproduced signal detection unit is transmitted through the light shading means.

Furthermore, the above-described embodiments explain the structures in which the reflected light is split into polarized components by the polarization beam splitter and a reproduced signal is detected by differential detection. However, the present invention is not necessarily limited by such a structure, and can be implemented by a structure if it detect a reproduced signal by using the respective polarized components.

Industrial Applicability

As described above, according to the present invention, since reflected light from a magneto-optical disk is transmitted through light shading means so that a polarized component as a signal component is transmitted at a higher ratio than other polarized component which is not a signal component in substantially the central portion of the reflected light, a reproduced signal is magnified, and thereby improving the S/N and enabling super resolution reproduction. Additionally, since the light transmitted through the light shading means is condensed, the light component proportional to the magnitude of the reproduced signal is increased, and the S/N of the reproduced signal is further improved. The present invention produces such significant effects.

What is claimed is:

1. A magneto-optical head device for obtaining a reproduced signal by using reflected light from a magneto-optical recording medium, comprising:

light shading means on which the reflected light incides, said light shading means including a polarization film having a higher transmittance for a predetermined polarized component than for other polarized components in substantially a central portion of the reflected light incident thereon.

2. The magneto-optical head device as set forth in claim 1, wherein said polarization film is a dielectric multilayer film which transmits the predetermined polarized component and reflects or absorbs the other polarized component.

3. The magneto-optical head device as set forth in claim 1, wherein the predetermined polarized component selectively transmitted through said polarization film has the same polarization direction as that of a light beam irradiated on said magneto-optical recording medium.

4. The magneto-optical head device as set forth in claim 1, wherein condensing means for condensing the reflected light transmitted through said light shading means is arranged.

5. The magneto-optical head device as set forth in claim 1, further comprising condensing means for condensing the reflected light so that the condensed reflected light is transmitted through said light shading means.

6. A magneto-optical head device comprising:

an objective lens on which reflected light from a magneto-optical recording medium incides;

a beam splitter for splitting the reflected light into a light beam for detecting a reproduced signal and a light beam for detecting a focusing error and tracking error;

light shading means on which the reflected light incides; and the reproduced signal detection unit for detecting a reproduced signal by using the reflected light transmitted through said light shading means, wherein said light shading means includes a polarization film having a higher transmittance for a predetermined polarized component than for other polarized component in substantially a central portion of the reflected light incident thereon, and is placed at such a position that the reflected light split by said beam splitter incides thereon.

7. The magneto-optical head device as set forth in claim 6, wherein said polarization film is a dielectric multilayer film which transmits the predetermined polarized component and reflects or absorbs the other polarized component.

8. The magneto-optical head device as set forth in claim 6, wherein the predetermined polarized component selectively transmitted through said polarization film has the same polarization direction as that of a light beam irradiated on said magneto-optical recording medium.

9. The magneto-optical head device as set forth in claim 6, wherein condensing means for condensing the reflected light transmitted through said light shading means is arranged.

10. The magneto-optical head device as set forth in claim 6, further comprising condensing means for condensing the reflected light so that the condensed reflected light is transmitted through said light shading means.

11. A magneto-optical head device comprising:

an objective lens on which reflected light from a magneto-optical recording medium incides;

a beam splitter for splitting the reflected light into a light beam for a reproduced signal detection unit and a light beam for detecting a reproduced signal and a light beam for detecting a focusing error and tracking error;

light shading means on which the reflected light incides; and the reproduced signal detection unit for detecting a reproduced signal by using the reflected light transmitted through said light shading means, wherein said light shading means includes a polarization film having a higher transmittance for a predetermined polarized component than for other polarized component in substantially a central portion of the reflected light incident thereon, and is placed at such a position that the reflected light transmitted through said light shading means incides on said beam splitter.

12. The magneto-optical head device as set forth in claim 11, wherein said polarization film is a dielectric multilayer film which transmits the predetermined polarized component and reflects or absorbs the other polarized component.

13. The magneto-optical head device as set forth in claim 11, wherein the predetermined polarized component selectively transmitted through said polarization film has the same polarization direction as that of a light beam irradiated on said magneto-optical recording medium.

14. The magneto-optical head device as set forth in claim 11, wherein condensing means for condensing the reflected light transmitted through said light shading means is arranged.

15. The magneto-optical head device as set forth in claim 11, further comprising condensing means for condensing the reflected light so that the condensed reflected light is transmitted through said light shading means.

* * * * *